US012789388B2

(12) United States Patent
Calandra et al.

(10) Patent No.: US 12,789,388 B2
(45) Date of Patent: Nov. 10, 2026

(54) DIGITIZING TOUCH WITH ARTIFICIAL ROBOTIC FINGERTIP

(71) Applicant: Meta Platforms Technologies, LLC, Menlo Park, CA (US)

(72) Inventors: Roberto Calandra, Dresden (DE); Michael Maroye Lambeta, Los Gatos, CA (US); Tingfan Wu, San Mateo, CA (US); Victoria Rose Most, Oakland, CA (US); Kevin Sawyer, Cupertino, CA (US); Romeo Iguico Mercado, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 429 days.

(21) Appl. No.: 18/503,727

(22) Filed: Nov. 7, 2023

(65) Prior Publication Data

US 2024/0149466 A1 May 9, 2024

Related U.S. Application Data

(60) Provisional application No. 63/383,069, filed on Nov. 9, 2022.

(51) Int. Cl.
*B25J 13/08* (2006.01)
*B25J 15/00* (2006.01)
(Continued)

(52) U.S. Cl.
CPC ......... *B25J 13/081* (2013.01); *B25J 15/0009* (2013.01); *B25J 19/023* (2013.01); *G06F 3/041* (2013.01); *G06V 10/82* (2022.01)

(58) Field of Classification Search
CPC .... B25J 13/081; B25J 13/084; B25J 15/0009; B25J 19/021; B25J 19/023; G06F 3/041; G06V 10/82
See application file for complete search history.

(56) References Cited

U.S. PATENT DOCUMENTS 12,128,562 B2 * 10/2024 Ishizaki ................. B25J 9/1612
12,235,179 B2 * 2/2025 Ebert ..................... B25J 13/084
(Continued)

FOREIGN PATENT DOCUMENTS

EP 2859961 A2 4/2015
WO 2021081084 A1 4/2021

OTHER PUBLICATIONS

Corradi T., et al., "Tactile Features: Recognising Touch Sensations With a Novel and Inexpensive Tactile Sensor," Sep. 1, 2014, SAT 2015, Lecture Notes in Computer Science, 10 pages.
(Continued)

*Primary Examiner* — Michael B. Pierorazio
(74) *Attorney, Agent, or Firm* — Seyfarth Shaw LLP

(57) ABSTRACT

In one embodiment, a system includes a silicone hemispherical dome and an omnidirectional optical system. The dome includes a surface including a reflective silver-film layer. The optical system includes a lens including multiple lens elements with the first lens element in direct contact with the hemispherical dome without airgap. The lens is configured to capture scattering of internal incident light generated by the reflective silver-film layer. The optical system also includes an image sensor configured to generate image data from data captured by the lens. The system also includes non-image sensors. The system further includes processors and a non-transitory memory coupled to the processors comprising instructions executable by the processors, the processors operable when executing the instructions to access the image data from the omnidirectional optical system and sensing data from the non-image sensors and generate touch digitization based on the accessed image and sensing data by machine-learning models.

20 Claims, 38 Drawing Sheets

(51) Int. Cl.

*B25J 19/02* (2006.01)
*G06F 3/041* (2006.01)
*G06V 10/82* (2022.01)

(56) References Cited

U.S. PATENT DOCUMENTS

| | | | | |
|---|---|---|---|---|
| 2010/0292837 | A1* | 11/2010 | Takahashi | B25J 15/0009 700/245 |
| 2017/0195568 | A1 | 7/2017 | Leizerovich, Jr. et al. | |
| 2019/0176326 | A1* | 6/2019 | Bingham | B25J 9/1612 |
| 2020/0139543 | A1* | 5/2020 | Saito | B25J 15/10 |
| 2021/0023714 | A1* | 1/2021 | Zhang | H04N 13/254 |
| 2022/0314438 | A1* | 10/2022 | Ishizaki | G01G 19/00 |
| 2023/0074958 | A1* | 3/2023 | Ebert | G01L 5/226 |

OTHER PUBLICATIONS

Do W.K., et al., "DenseTact: Optical Tactile Sensor for Dense Shape Reconstruction," arXiv:2201.01367v4, Mar. 8, 2022, 7 pages.
International Preliminary Report on Patentability for International Application No. PCT/US2023/037113, mailed May 22, 2025, 10 pages.
International Search Report and Written Opinion for International Application No. PCT/US2023/037113, mailed Mar. 25, 2024, 15 pages.
Natale L., et al., "Tactile Sensing," Arxiv.org, May 7, 2021, 24 pages.
Scharff R.B.N., et al., "Rapid Manufacturing of Color-based Hemispherical Soft Tactile Fingertips," arXiv:2112.05536v2, May 3, 2022, 7 pages.
Zhou Y., et al., "Solid Immersion Maxwell's Fish-Eye Lens Without Drain," Physical Review Applied, Mar. 1, 2022, vol. 17, No. 3, 8 pages.
Abad; et al., "Visuotactile Sensors with Emphasis on Gelsight Sensor: A Review," IEEE Sensors Journal, Jul. 15, 2020, vol. 20, No. 14, 12 pages.
Ardiel; et al., "The Importance of Touch in Development," Paediatrics Child Health, Mar. 1, 2010, vol. 15, No. 03, pp. 153-156.
Calandra; et al., "The Feeling of Success: Does Touch Sensing Help Predict Grasp Outcomes?," arXiv:1710.05512v1, Oct. 16, 2017, 10 pages.
Choi; et al., "Dexterous Object Manipulation by a Multi-Fingered Robotic Hand with Visual-Tactile Fingertip Sensors," ROBOMECH Journal, Mar. 12, 2020, 22 pages.
Dahiya; et al., "Tactile Sensing—From Humans to Humanoids," IEEE Transactions on Robotics, Nov. 20, 2009, vol. 26, No. 01, 20 pages.
Dewey; "The Reflex ARC Concept in Psychology," Psychological Review, Jul. 1896, vol. 03, No. 04, pp. 357-370.
Dunbar; et al., "The Social Role of Touch in Humans and Primates: Behavioural Function and Neurobiological Mechanisms," Neuroscience Biobehavioral Reviews, Feb. 2010, vol. 34, No. 02, pp. 260-268.
Gomes; et al., "Blocks World of Touch: Exploiting the Advantages of All-Around Finger Sensing in Robot Grasping," Frontiers in Robotics and AI, Nov. 19, 2020, vol. 07, 35 pages.
Gomes; et al., "Geltip: A Finger-Shaped Optical Tactile Sensor for Robotic Manipulation," 2020 IEEE/RSJ International Conference on Intelligent Robots and Systems (IROS), Oct. 25-29, 2020, pp. 9903-9909.
Handler; et al., "The Mechanosensory Neurons of Touch and Their Mechanisms of Activation," Nature Reviews Neuroscience, Jul. 26, 2021, vol. 22, 17 pages.
Hayward; "Is there a 'plenhaptic' function?," Philosophical Transactions of the Royal Society B: Biological Sciences, Nov. 11, 2011, vol. 366, pp. 3115-3122.
He; et al., "Deep Residual Learning for Image Recognition," In Proceedings of The IEEE Conference on Computer Vision and Pattern Recognition, Jun. 27-30, 2016, pp. 770-778.
Johansson; et al., "Coding and use of Tactile Signals from the Fingertips in Object Manipulation tasks," Nature Reviews Neuroscience, May 2009, vol. 10, pp. 345-359.
Johansson; et al., "Tactile Sensibility in the Human Hand: Relative and Absolute Densities of Four Types of Mechanoreceptive Units in Glabrous Skin," The Journal of physiology, Jan. 1, 1979, vol. 286, pp. 283-300.
Johnson; et al., "The Roles and Functions of Cutaneous Mechanoreceptors," Current Opinion in Neurobiology, Aug. 2001, vol. 11, No. 04, pp. 455-461.
Lambeta; et al., "Digit: A Novel Design for a Low-Cost Compact High-Resolution Tactile Sensor with Application to In-Hand Manipulation," IEEE Robotics and Automation Letters, Jul. 2020, vol. 05, No. 03, 8 pages.
Lambeta; et al., "PyTouch: A Machine Learning Library for Touch Processing," 2021 IEEE International Conference on Robotics and Automation (ICRA), May 26, 2021, 7 pages.
Li; et al., "A Review of Tactile Information: Perception and Action through Touch," IEEE Transactions on Robotics, Dec. 2020, vol. 36, No. 06, 14 pages.
Padmanabha; et al., "OmniTact: A Multi-Directional High-Resolution Touch Sensor," 2020 IEEE International Conference on Robotics and Automation (ICRA), May 31, 2020, pp. 618-624.
Patel; et al., "Digger Finger: Gelsight Tactile Sensor for Object Identification Inside Granular Media," Experimental Robotics: The 17th International Symposium, Springer International Publishing, Mar. 28, 2021, 10 pages.
Romero; et al., "Soft, Round, High Resolution Tactile Fingertip Sensors for Dexterous Robotic Manipulation," arXiv: 2005.09068v1, May 18, 2020, 7 pages.
Sahli; et al., "Tactile Perception of Randomly Rough Surfaces," Scientific Reports, Sep. 25, 2020, vol. 10, 12 pages.
Sandler; et al., "MobileNetV2: Inverted Residuals and Linear Bottlenecks," IEEE Conference on Computer Vision and Pattern Recognition (CVPR), Jan. 2018, pp. 4510-4520.
Sun; et al., "A Soft Thumb-Sized Vision-Based Sensor with Accurate All-Round Force Perception," Nature Machine Intelligence, Feb. 23, 2022, vol. 04, pp. 135-145.
Zhang; et al., "Target Classification Method of Tactile Perception Data With Deep Learning," Entropy, Nov. 18, 2021, vol. 23, 16 pages.

* cited by examiner

400

Fingertip Regions

Lens

Lens Cutaway

Clear Aperture Data:
(Radius In mm)

| | |
|---|---|
| CIR S4 | 4.748376 |
| CIR S5 | 1.707403 |
| CIR S6 | 1.341748 |
| CIR S7 | 0.538351 |
| CIR S8 | 0.151529 |
| CIR S9 | 0.574821 |
| CIR S10 | 0.794950 |
| CIR S11 | 0.862950 |
| CIR S12 | 0.888102 |
| CIR S13 | 0.897415 |
| CIR S14 | 0.866286 |
| CIR S15 | 0.842312 |
| CIR S16 | 0.808351 |

Max Normal Force Only (t=20)

Max Normal And Max Shear Force (t=30)

Human Reflex-Arc

Slow Host-Processing

Robot Reflex-Arc

DIGITIZING TOUCH WITH ARTIFICIAL ROBOTIC FINGERTIP

PRIORITY

This application claims the benefit under 35 U.S.C. § 119(e) of U.S. Provisional Patent Application No. 63/383,069, filed 9 Nov. 2022, which is incorporated herein by reference.

TECHNICAL FIELD

This disclosure generally relates to robotics, and in particular relates to hardware and software for smart robotic sensing.

BACKGROUND

Artificial intelligence (AI) is the intelligence of machines or software. AI technology is widely used throughout industry, government and science, such as advanced web search engines, recommendation systems, understanding human speech, self-driving cars, generative or creative tools, and competing at the highest level in strategic games.

Robotics is an interdisciplinary branch of electronics and communication, computer science and engineering. Robotics involves the design, construction, operation, and use of robots. The goal of robotics is to design machines that can help and assist humans. Robotics integrates fields of mechanical engineering, electrical engineering, information engineering, mechatronics engineering, electronics, biomedical engineering, computer engineering, control systems engineering, software engineering, mathematics, etc. The field of robotics develops machines that can automate tasks and do various jobs that a human might not be able to do. Certain robots require user input to operate, while other robots function autonomously.

SUMMARY OF PARTICULAR EMBODIMENTS

Touch is a sensing modality that may provide rich information about object properties and interactions with the physical environment. Humans and robots both benefit from using touch to perceive and interact with the surrounding environment. However, no existing systems may provide rich, multimodal digital touch-sensing capabilities while retaining the form factor of a human finger. The embodiments disclosed herein may improve the digitization of touch with technological advances embodied in an artificial finger-shaped sensor with enhanced sensing capabilities. In particular embodiments, the artificial fingertip may comprise high-resolution sensors (e.g., approximately 8.3 million taxels) that respond to omnidirectional touch, capture multimodal signals, and use on-device artificial intelligence to process the data in real time. For example, in particular embodiments, evaluations show that the artificial fingertip can resolve spatial features as small as 7 um, sense normal and shear forces with a resolution between, e.g., 1 mN and 1.3 mN respectively, perceive vibrations up to, e.g., 9-11 kHz, sense odor, and even sense heat. Furthermore, the on-device AI neural-network accelerator may act as a peripheral nervous system on a robot and mimic the reflex-arc found in humans. These results demonstrate the embodiments disclosed herein may digitize touch with enhanced performance. The embodiments disclosed herein may be applied in fields including robotics (industrial, medical, agricultural, and consumer-level), virtual reality and telepresence, prosthesis, and e-commerce. Although this disclosure describes digitizing particular modality in a particular manner, this disclosure contemplates digitizing any suitable modality in any suitable manner.

In particular embodiments, a system for touch digitization may comprise a silicone hemispherical dome comprising a surface comprising a reflective silver-film layer. The system may additionally comprise an omnidirectional optical system comprising a lens comprising a plurality of lens elements and an image sensor configured to generate image data from data captured by the lens. In particular embodiments, a first lens element of the plurality of lens elements may be in direct contact with the hemispherical dome without airgap. The lens may be configured to capture scattering of internal incident light generated by the reflective silver-film layer. The system may also comprise one or more non-image sensors disposed underneath the omnidirectional optical system. The system may further comprise one or more processors and a non-transitory memory coupled to the processors comprising instructions executable by the processors. In particular embodiments, the processors may be operable when executing the instructions to access the image data from the omnidirectional optical system and sensing data from the one or more non-image sensors and generate the touch digitization based on the accessed image and sensing data by one or more machine-learning models.

In particular embodiments, an artificial fingertip for touch digitization may comprise a silicone hemispherical dome. The artificial fingertip may also comprise an omnidirectional optical system comprising a lens comprising a plurality of lens elements and an image sensor configured to generate image data from data captured by the lens. In particular embodiments, a first lens element of the plurality of lens elements may be in direct contact with the silicone hemispherical dome without airgap. The artificial fingertip may further comprise one or more non-image sensors disposed underneath the omnidirectional optical system.

Certain embodiments disclosed herein may provide one or more technical advantages. A technical advantage of the embodiments may include improved sensitivity to input stimuli by using dynamic lighting with variable wavelength and direction for reconstruction of touch surface topology signals (images) as the system disclosed herein moves beyond the traditional Lambertian scattering paradigm towards a controlled degree scattering surface along with a ground up approach on optimizing the material properties for the highest sensitivity to spatial features, which is achieved by developing a new process for chemically growing a thin-film layer of silver film onto the fingertip surface. Another technical advantage of the embodiments may include high spatial resolution in capturing minute details on the surface of the fingertip, which allows for bypassing traditional methods of capturing normal and shear forces through the use of markers. The embodiments disclosed herein utilize a 3-region solid immersion hyperfisheye lens design for touch digitization systems in a non-airgap configuration to a PDMS material. Due to the design and specific requirements for non-human imaging, the embodiments disclosed herein are able to maintain a superior performance of the modulation transfer function (MTF) through the entire field of the lens, thereby ensuring spatial performance along the tip, side and edges of the fingertip. In addition, the omnidirectional surface using a single camera and lens system may achieve full field view of over 200 degrees. Another technical advantage of the embodiments may include high temporal resolution based on interchangeable and modular electronic stack-up for touch digitization (vision capture, multi-modal capture, on-device AI processing), which combines all electronics and sensing elements into a familiar size and shape of a human thumb. Each individual system of the stack-up can be interchanged with a newer design to reduce the hardware development lifecycle, furthermore, components in the stack-up can be excluded to further reduce the size of the sensor based on individual requirements of the application. Another technical advantage of the embodiments may include digitizing touch signals for on-device AI processing for providing human-like reflex arc actions to robotic manipulators as a neural network processor is inside the fingertip for direct inference on input data and a processor can provide direct outputs to control a secondary device such as a robotic end effector. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
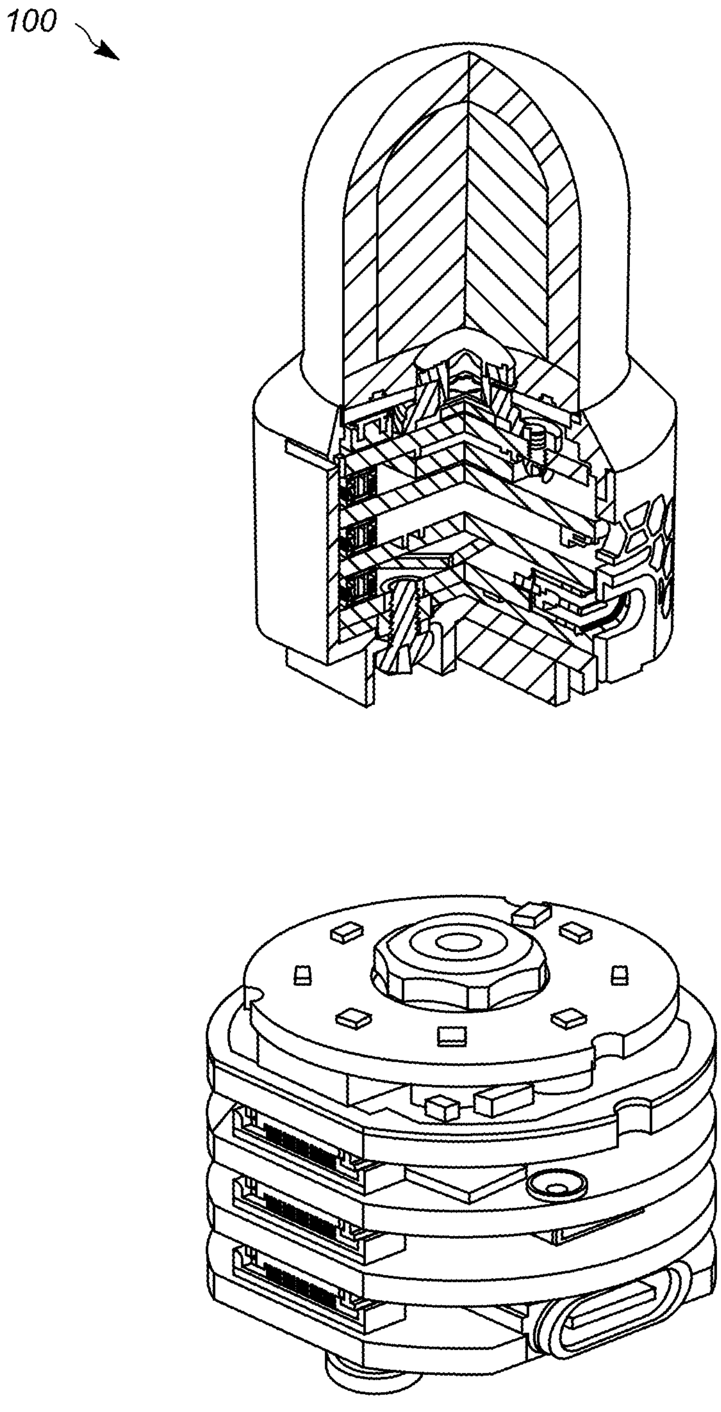
FIG. 1 illustrates an example cutaway diagram of the artificial fingertip disclosed herein and its modular electronics.

Touch is a sensing modality that may provide rich information about object properties and interactions with the physical environment. Humans and robots both benefit from using touch to perceive and interact with the surrounding environment. However, no existing systems may provide rich, multimodal digital touch-sensing capabilities while retaining the form factor of a human finger. The embodiments disclosed herein may improve the digitization of touch with technological advances embodied in an artificial finger-shaped sensor with enhanced sensing capabilities. In particular embodiments, the artificial fingertip may comprise high-resolution sensors (e.g., approximately 8.3 million taxels) that respond to omnidirectional touch, capture multimodal signals, and use on-device artificial intelligence to process the data in real time. For example, in particular embodiments, evaluations show that the artificial fingertip can resolve spatial features as small as 7 um, sense normal and shear forces with a resolution between, e.g., 1 mN and 1.3 mN respectively, perceive vibrations up to, e.g., 9-11 kHz, sense odor, and even sense heat. Furthermore, the on-device AI neural-network accelerator may act as a peripheral nervous system on a robot and mimic the reflex-arc found in humans. These results demonstrate the embodiments disclosed herein may digitize touch with enhanced performance. The embodiments disclosed herein may be applied in fields including robotics (industrial, medical, agricultural, and consumer-level), virtual reality and telepresence, prosthesis, and e-commerce. Although this disclosure describes digitizing particular modality in a particular manner, this disclosure contemplates digitizing any suitable modality in any suitable manner.

In particular embodiments, a system for touch digitization may comprise a silicone hemispherical dome comprising a surface comprising a reflective silver-film layer. The system may additionally comprise an omnidirectional optical system comprising a lens comprising a plurality of lens elements and an image sensor configured to generate image data from data captured by the lens. In particular embodiments, a first lens element of the plurality of lens elements may be in direct contact with the silicone hemispherical dome without airgap. The lens may be configured to capture scattering of internal incident light generated by the reflective silver-film layer. The system may also comprise one or more non-image sensors disposed underneath the omnidirectional optical system. The system may further comprise one or more processors and a non-transitory memory coupled to the processors comprising instructions executable by the processors. In particular embodiments, the processors may be operable when executing the instructions to access the image data from the omnidirectional optical system and sensing data from the one or more non-image sensors and generate the touch digitization based on the accessed image and sensing data by one or more machine-learning models.

In particular embodiments, an artificial fingertip for touch digitization may comprise a silicone hemispherical dome. The artificial fingertip may also comprise an omnidirectional optical system comprising a lens comprising a plurality of lens elements and an image sensor configured to generate image data from data captured by the lens. In particular embodiments, a first lens element of the plurality of lens elements may be in direct contact with the hemispherical dome without airgap. The artificial fingertip may further comprise one or more non-image sensors disposed underneath the omnidirectional optical system.

Of all human senses, touch may be the most critical in how humans interact with the world. Touch may enable humans to measure forces and recognize object properties, e.g., shape, weight, density, textures, friction, elasticity. Touch may also play an important role both in social relationships and in cognitive development. By comparison, the earliest efforts to impart that sense to robots came no closer than crude approximations. No solutions have emerged for digitizing touch with the same rich sensorial spectrum humans take for granted. Toward the advancement of robotic in-hand manipulation, the embodiments disclosed herein may mimic familiar features of the human hand: fingers. The touch digitization in the embodiments disclosed herein may enable intelligent systems to discern significantly higher levels of physical information during environmental interaction.

Digitizing touch may depend on two features including one temporal in nature and one spatial. Temporal features may process information from basic signals of time variation, whereas spatial features may process a discrete multi-dimensional array of temporal signals. The embodiments disclosed herein combine these methods within a unified platform to improve the capabilities of touch digitization, i.e., a modular, finger-shaped, multimodal tactile sensor with on-device artificial intelligence (AI) capabilities and superhuman performance.

In particular embodiments, the artificial fingertip may comprise a multimodal modular sensor. The multimodal modular sensor may comprise a main body mechanical housing. As an example and not by way of limitation, the main body mechanical housing may have a similar shape and size to the human thumb. In particular embodiments, the silicone hemispherical dome, the omnidirectional optical system, the one or more non-image sensors, the one or more processors, and the non-transitory memory may be disposed in the housing. The multimodal modular sensor may also comprise a soft silicone solid body fingertip. As an example and not by way of limitation, the soft silicone may be comprised of a polydimethysiloxane (PDMS) material. In other words, the silicone hemispherical dome may be based on a Polydimethylsiloxane (PDMS) material. The solid boy fingertip may comprise a chemically grown metallic silver reflective layer and an outer layer to protect the reflective layer. The multimodal modular sensor may additionally comprise multimodal electronics. The multi-modal electronics may extend past the traditional limits of the vision-based modality, which may be limited by the capture rate of the CMOS. Instead, the optical system disclosed herein may capture at a variable frames per second (e.g., 240 fps, depending on the capability of the CMOS) whereas the multimodal inclusion may allow for capturing temporal data up to 10,000 Hz. This is a system level contribution using off-the-shelf components but assembling them in a manner which allows for directly sampling or capturing signals due to input stimuli on the fingertip surface. In particular embodiments, the multimodal electronics may be enabled by a custom over molding and molding technology by placing the electronics directly into the mold, injecting silicone, and placing the mold under vacuum to ensure the liquid silicone can entire all portholes and crevices around the off-the-shelf sensors.

In particular embodiments, the one or more non-image sensors may comprise one or more of an inertial measurement unit (IMU) sensor, a microphone, an environmental sensor, a gas sensor, a pressure sensor, or a temperature sensor. The multimodal modular sensor may comprise inertial measurement units (IMU) in the main housing for processing electronics. The IMU may be rigidly coupled to the enclosure and fingertip. The IMU may be used for sensing vibrations, rotations, and position of the fingertip. The multimodal modular sensor may also comprise MEMS based microphones in the multimodal sensing printed circuit board (PCB), which may be over molded directly to the soft silicone solid body fingertip. In one example embodiment, there may be two microphones with a top porthole, and two with a bottom porthole. Two microphones may be digital, and two microphones may be analog which differ in their sensing frequency ranges to cover a larger bandwidth. These microphones may provide surface audio textures similar to what human's fingertip would perceive when scratching the surface of an object, sampling object-object or object-environment interactions.

In particular embodiments, the multimodal modular sensor may additionally comprise an environmental sensor in the main housing. Internal air flow may be provided by a micro-sized inlet fan, which creates airflow through the device. The environmental sensor may be capable of sampling local air for air pressure, temperature, moisture and humidity. The multimodal modular sensor may also comprise a gas sensor in the main housing. Internal air flow may be provided by a micro-sized inlet fan which creates airflow through the device. The gas sensor may identify chemical compounds and compositions of local air samples to provide object state information and for classification of different objects. The multimodal modular sensor may further comprise pressure/temperature sensor in the multimodal sensing PCB, which may be over molded directly to the soft silicone solid body fingertip. The pressure/temperature sensor may measure absolute values of compression force being applied to the fingertip and capture heat gradients caused by a heat source on the fingertip and heat flow due to the metallic reflective layer.

In particular embodiments, the multimodal modular sensor may comprise processing electronics. The system may further comprise a stack-up comprising a plurality printed circuit boards for the one or more processors, the omnidirectional optical system, and a data transfer system, wherein the plurality printed circuit boards share a common electrical interface and connector stack. In other words, the processing electronics may be in a stack-up that combines in a limited space five separate and unique PCB's which share a common electrical interface and connector stack. The processing electronics may comprise a microprocessor, a neural-network accelerator, an image capture system, and a data transfer system.

In particular embodiments, the one or more processors may comprise one or more of a microprocessor or an accelerator. The microprocessor may be responsible for acquiring all the data from the sensors, lightweight processing, and configuration of processing and sampling parameters. In particular embodiments, the one or more machine-learning models may comprise one or more neural-network models. Correspondingly, the one or more processors may comprise one or more neural-network accelerators which are configured for accelerating real-time inference on the accessed image and sensing data by the one or more neural-network models. The neural-network accelerator may have direct access to the microprocessor to obtain a selectable stream of data, whether this be image data or non-image data. The neural-network accelerator may provide neural-network acceleration which can be uploaded based on offline training to perform real-time inference on the input data streams. The neural-network accelerator may also have direct access to providing output control signals to a secondary device. In one example embodiment, the secondary device may comprise a robotic end effector. As an example and not by way of limitation, the secondary device may be an individual finger on a robotic hand, which may allow for rapid reflexes of the finger based on input data. The image capture system may be responsible for capturing image frames from the complementary metal-oxide semiconductor (CMOS) and configuring the sampling parameters towards different frames per second and resolutions. The data transfer system may provide a USB interface to a host computer which combines all multi-modal information and image/vision information over a single connector, this also powers the device.

The embodiments disclosed herein may be used in a variety of applications. As an example and not by way of limitation, these applications may include medical applications such as prosthetics, palpation, sensing and localization (e.g., breast, testicular cancers, etc.), remote surgery, etc. As another example and not by way of limitation, these applications may include advertisements such as e-commerce, capturing the feeling of clothes, understanding the feeling of skin and the application of cosmetics, etc. As yet another example and not by way of limitation, these applications may include agriculture such as fruit/vegetable picking, food quality determination, food handling, etc. As yet an example and not by way of limitation, these applications may include haptics such as using artificial fingertips to capture the physical word accurately.

FIG. 1 illustrates an example cutaway diagram 100 of the artificial fingertip disclosed herein and its modular electronics. Conventional efforts in the field may have involved subsets of sensing modalities, optimized for cost, for iterations in fingertip geometries, or for maximizing a particular design metric. But those choices may have limitations in performance. The main sensing modality of vision-based tactile sensors may capture the geometry of the object being touched. From that geometric data it may be possible to reconstruct normal and shear forces. However, that particular modality may fall short of the multimodal nature of human skin, which uses many different types of receptors (such as mechanoreceptors, thermoreceptors and nociceptors). In contrast with the conventional efforts, the disclosed artificial fingertip, as shown in FIG. 1, may include 5 printed circuit boards directly within the fingertip. This is a self-contained design. All of these printed circuit boards are custom designed. From top to bottom, the disclosed artificial fingertip comprise a multimodal sensor system, CMOS, an image capture system, processing and neural-network accelerator, and data transfer system.

Figure 2A:
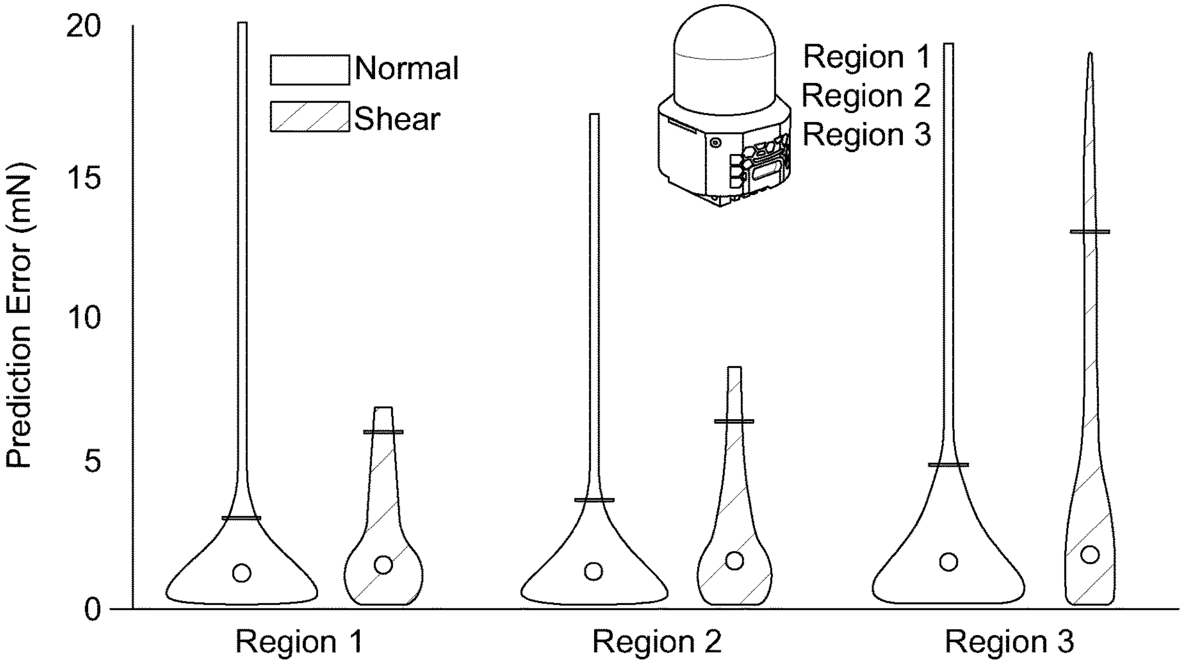
FIG. 2A illustrates example evaluations of normal and shear forces in three separate regions of the sensor, from the tip toward the side.
Figure 2B:
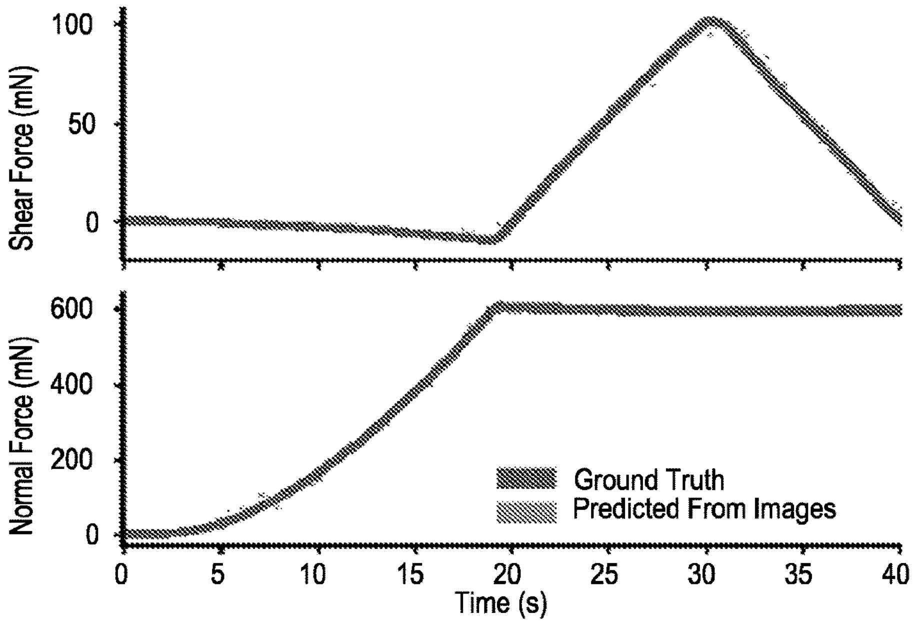
FIG. 2B illustrates an example prediction of normal and shear forces from visuo-tactile image output.
Figure 2C:
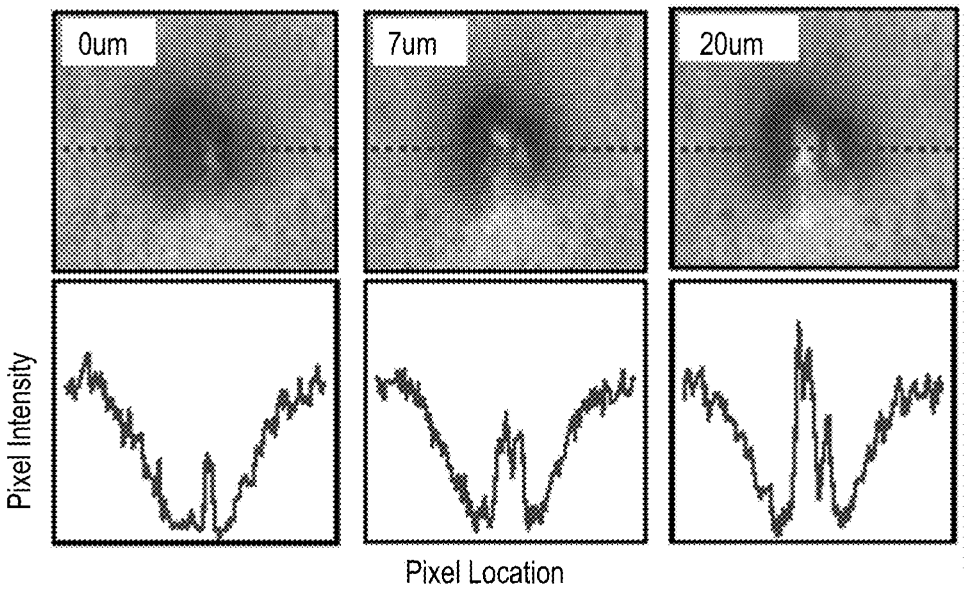
FIG. 2C illustrates example evaluations of spatial resolution by using a dual pronged microindenter depressed into the artificial fingertip with varying width.
Figure 2D:
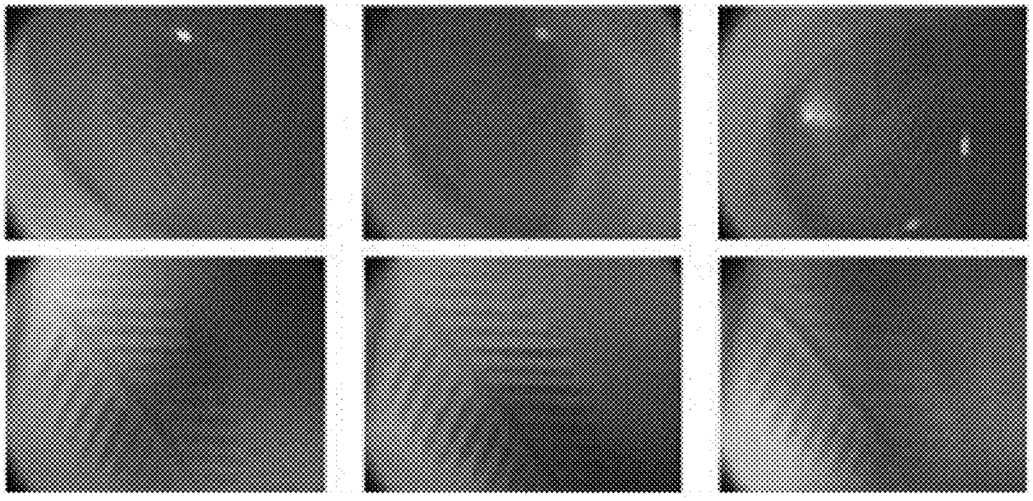
FIG. 2D illustrates example methods which create the artificial fingertip volume.
Figure 2E:
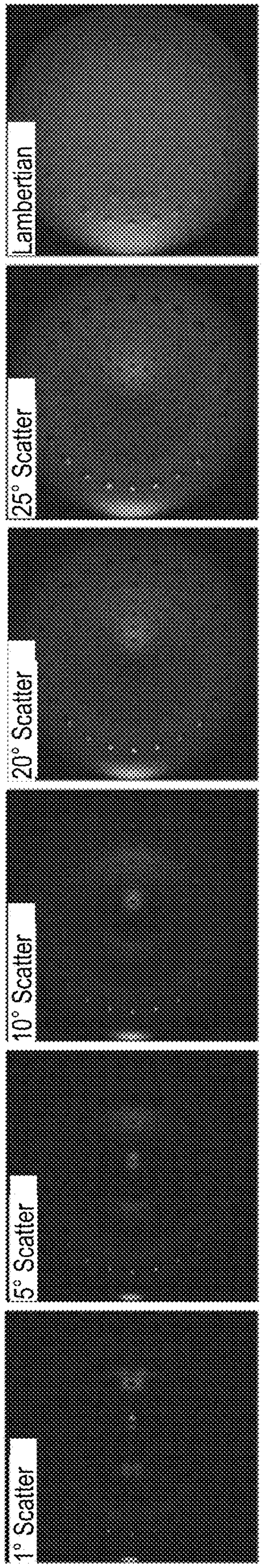
FIG. 2E illustrates an example simulation of the effects of increasing the surface scattering along the internal reflective layer of the artificial fingertip.

In deploying a high-end modular research platform for investigating touch and its digitization, the embodiments disclosed herein introduce a novel approach. The platform disclosed herein, identified as an artificial fingertip, may belong to the family of vision-based tactile sensors. FIG. 2A illustrates example evaluations of normal and shear forces in three separate regions of the sensor, from the tip toward the side. The dots and error bar show the median and 95-percentile of the error, respectively. For example, in particular embodiments, the median error from the deep-learning model for the three regions is 1.01 mN, 1.09 mN, 1.41 mN for normal forces, and 1.27 mN, 1.48 mN, 1.64 mN for shear forces. FIG. 2B illustrates an example prediction of normal and shear forces from visuo-tactile image output. Particular embodiments may train a deep-learning model to predict normal and shear forces from visuo-tactile image output. For example, in particular embodiments, normal and shear forces may be predicted with a median error of 1.01 mN and 1.27 mN respectively. Compared to conventional methods, predicting shear force may require the use of markers. However, with increased spatial resolution, far more features may be extracted from the visuo-tactile image which aid in shear force prediction. FIG. 2C illustrates example evaluations of spatial resolution by using a dual pronged microindenter depressed into the artificial fingertip with varying width. Visual validation and the inspection of the taxels' profile intensity confirmed the ability to clearly distinguish features as small as, e.g., 7 μm. FIG. 2D illustrates example methods which create the artificial fingertip volume. The top row corresponds to a method based on internal structure and the bottom row corresponds to a method based on solid gel with immersion lens. With an internal structure, illumination artifacts are visible whereas with a solid volume, the resulting image is far higher quality with less illumination artifacts. FIG. 2E illustrates an example simulation of the effects of increasing the surface scattering along the internal reflective layer of the artificial fingertip. From left to right, machine polish of 1° to Lambertian scattering, the embodiments disclosed herein optimize for image contrast while constraining the background illumination uniformity.

The platform disclosed herein may have an elastomer that serves as the touch-sensing interface, with a subcutaneous camera that measures the deformation of the elastomer though structured light. But in addition to that ability, the platform disclosed herein may be capable of sensing multiple tactile modes (see FIG. 2), including contact intensity and geometry, static and dynamic forces, surface audio textures and vibrations, heat change, fingertip velocity/acceleration/orientation, and even identification of some airborne chemical compounds. Further, to emulate the human reflex-arc, the embodiments disclosed herein introduce an on-device AI neural-network accelerator that provides next-generation touch-processing capabilities, enables real-time local processing to minimize reaction delays, and reduces communication bandwidth.

To effectively capture the nuances in touch interactions with the world, the artificial fingertip disclosed herein may be sensitive in both temporal and spatial domains. These domains may be obtained as modal signals encompassed within the artificial fingertip through visual, audio, vibration, pressure, heat and gas sensing. Commonly, conventional vision-based touch sensors using off-the-shelf imaging systems may be bound by slow visual capture rates which reduce the amount of sequential information resultant from frame encoding time and therefore limit the temporal nature of non-static touch interactions encountered during manipulation. Increasing the temporal frequency of the visual system may not be with benefit without an increase in spatial resolution for dynamic movements. The embodiments disclosed herein encompass the touch digitization system into the form of an artificial fingertip with similar geometry to a human finger. The surface of the fingertip may encode touch information from depressions in a reflective layer of which internal light reflections are captured by the camera. A visual tactile system may be utilized to resolve the minimum possible spatial features presented by an object interacting with the fingertip at high temporal rates. The artificial fingertip disclosed herein may advance through the spatial, temporal and multimodal performance through the embodiment of a modular platform for research into the digitization of touch. To achieve the high spatial and temporal performance demonstrated by the artificial fingertip disclosed herein, the embodiments disclosed herein leverage methodological breakthroughs in five different subsystems: elastomer interface, optical system, illumination system, multimodal sensing, and on-device AI processing.

When the reflective fingertip surface layer is subject to impression stimuli, the surface layer material properties may directly relate to the spatial resolving capabilities. The embodiments disclosed herein developed a design-of-experiment technique to identify these 6 material parameters which affect sensor sensitivity to input stimuli: Rg (fingertip radius), Tc (surface reflective coating layer thickness), Tg (surface layer thickness), h (height), Ec (coating Young's modulus), and Eg (fingertip volume Young's modulus). If Tc and Tg are too thick or exhibit low compliance a low pass filter effect may be evident on discrete object edges. Similarly, if the object is rich in spatial information and fractal dimension, the fingertip surface may resolve less features due to local gradients from material compliance. Particular embodiments may avoid specifying any constraints on the coating thickness layer to best capture small input stimuli while maintaining a suitable parameter range for the general size of the fingertip. Developing this layer onto the fingertip surface may involve manual hand painting, airbrushing or dip-coating techniques. However, while producing a touch image, they may be far from optimal and result in large coating thickness, and inconsistent yield from manufacturing variance. The embodiments disclosed herein solve this issue by developing a new chemical deposition technique for the growing of a silver thin film directly onto the surface of the fingertip which produces coating thicknesses far smaller than previous methods and thus achieve better sensitivity.

Common visuo-tactile sensors may capture input stimuli at a planar surface, use multiple cameras that are difficult to integrate and process together, or default to common off the shelf cameras optimized for human-centered imaging which result in downgraded optical performance in touch. Particular embodiments may refrain from the use of standard image-sensor features such as automatic exposure control, automatic white balance, and automatic focus which are designed for responding to changes in the natural environment as the fingertip chamber disclosed herein may be an enclosed and controlled environment. For modeling an isotropic representation of similar dimensions to a human fingertip, a new approach may be required to optimize the capture of the hemispherical surface. In optimizing for input stimuli from the touch interaction layer, the imaging system disclosed herein may not limit the performance within the finite element method simulation of the material properties. Hence, for example, particular embodiments may determine the optical system requirements to best suit capturing images related to tactile sensing with a CMOS pixel size of 1.1 um. Parameters may be chosen for converging spot size to increase spatial resolution, intentionally allowing chromatic aberration, introducing shallow depth of field to allow for defocus proportional to object indentation depth, and removing anti-reflective coatings to allow capture and interpretation of reflections and scattering inside the fingertip. However, such parameters may require a non-standard lens. Therefore, particular embodiments may utilize a custom solid immersion hyperfisheye lens to tackle to unique environment of visuo-tactile sensing, rather than an off-the-shelf lens catering towards general purpose imaging thus enabling full control over lens geometry and optical parameters.

The embodiments disclosed herein describe two metric parameters on the illumination performance within the volume, background uniformity, how evenly is the light distributed, and image to background uniformity contrast, how well do impressions on the surface of the fingertip stand out compared to the background as follows. A common approach may be the embodiment of an internal structure which serves as a hemispherical light pipe and provides fingertip rigidity. However, an internal light pipe structure may produce illumination artifacts in the form of glint and hotspots from the convex geometry which contribute to a degradation in image metrics. To reduce these artifacts, conventional approaches may make use of a textured surface to induce Lambertian scattering of incident light rays. Particular embodiments may model the reflective layer surface properties with controlled degrees of scattering from polished to Lambertian, where the entire hemispherical surfaces may act as an integrating sphere, to show that a Lambertian scattering surface may be not the optimal approach to achieve high-performance. Particular embodiments may use a rigid solid volume, instead of the more common hollow volume or use of an internal support structure, in conjunction with controlled reflective surface scattering parameters moving away from Lambertian surfaces.

The embodiments disclosed herein disclose a new platform and show that these advancements far outperform conventional visuo-tactile techniques in sensitivity to spatial and force sensitivity. While visual information may provide insight into environmental and object contact, such as textures, and surface deformations, this may only provide a subset of fingertip to object-environment understanding.

Figure 3A:
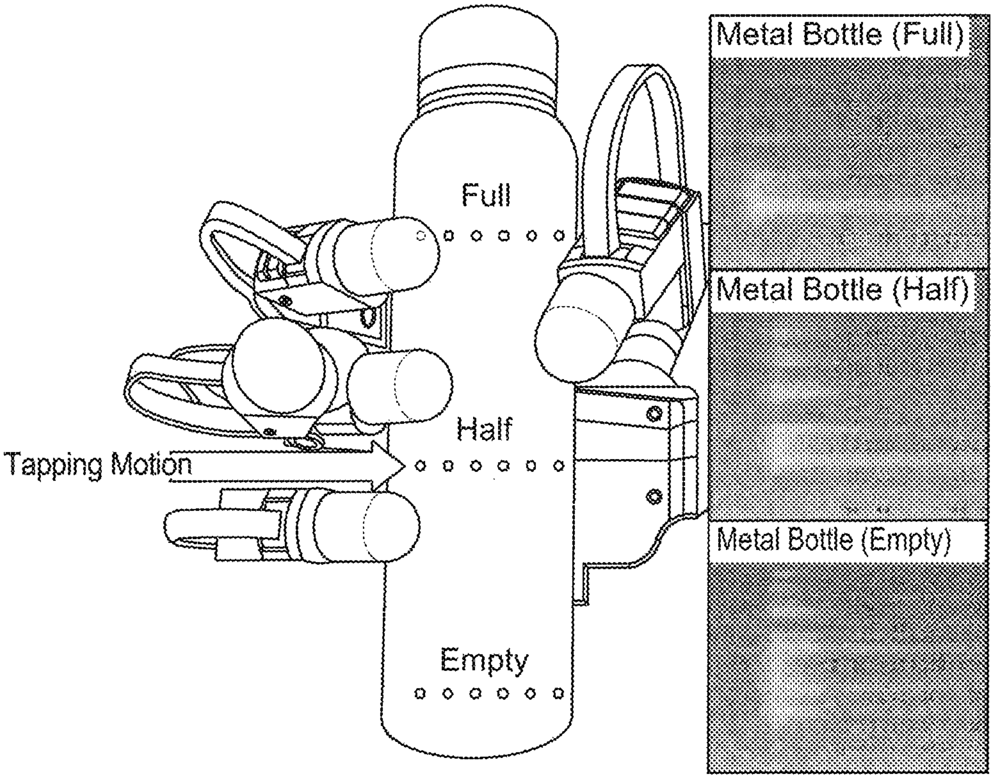
FIG. 3A illustrates the ability to determine the volume of water in an opaque container by tapping with one finger and recording the response on the fingers in contact with the container.
Figure 3A:
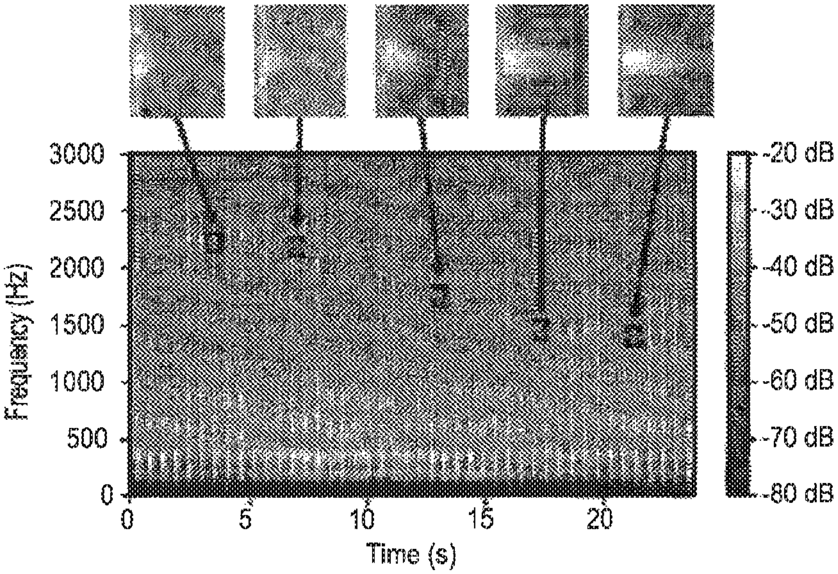
Figure 3A:
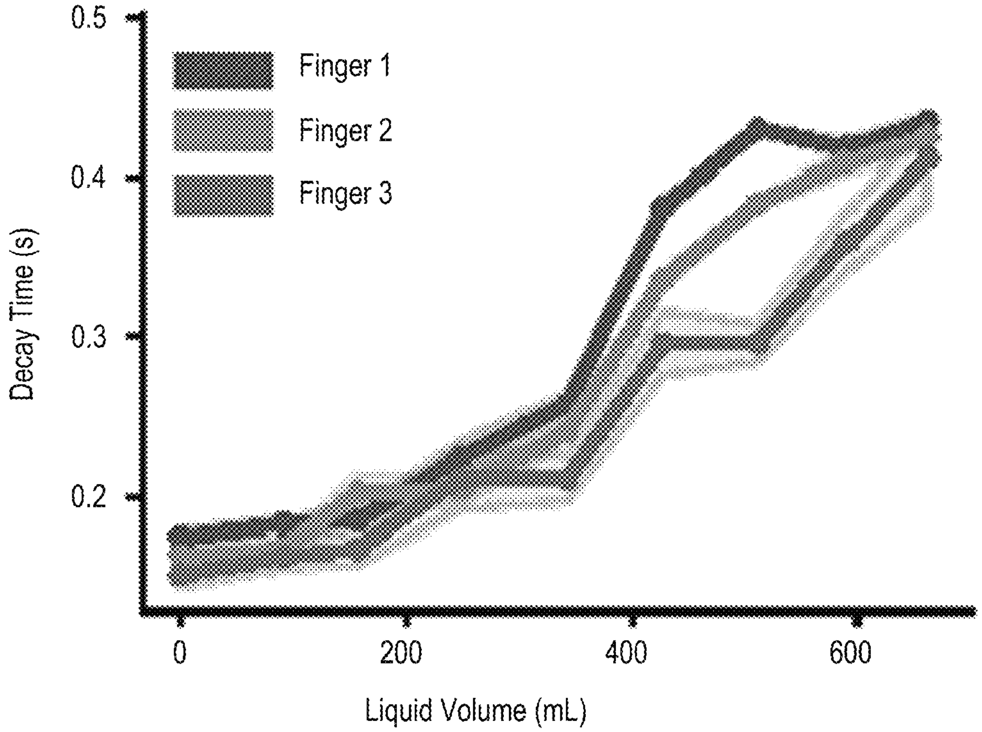
Figure 3A:
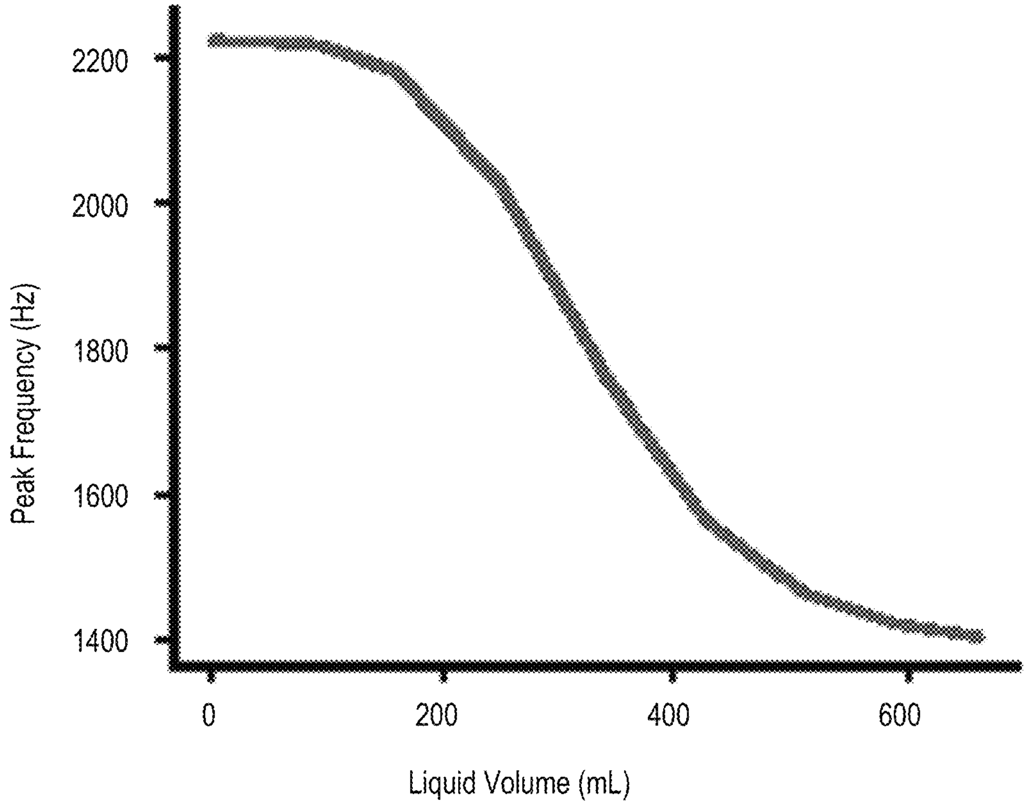
Figure 3B:
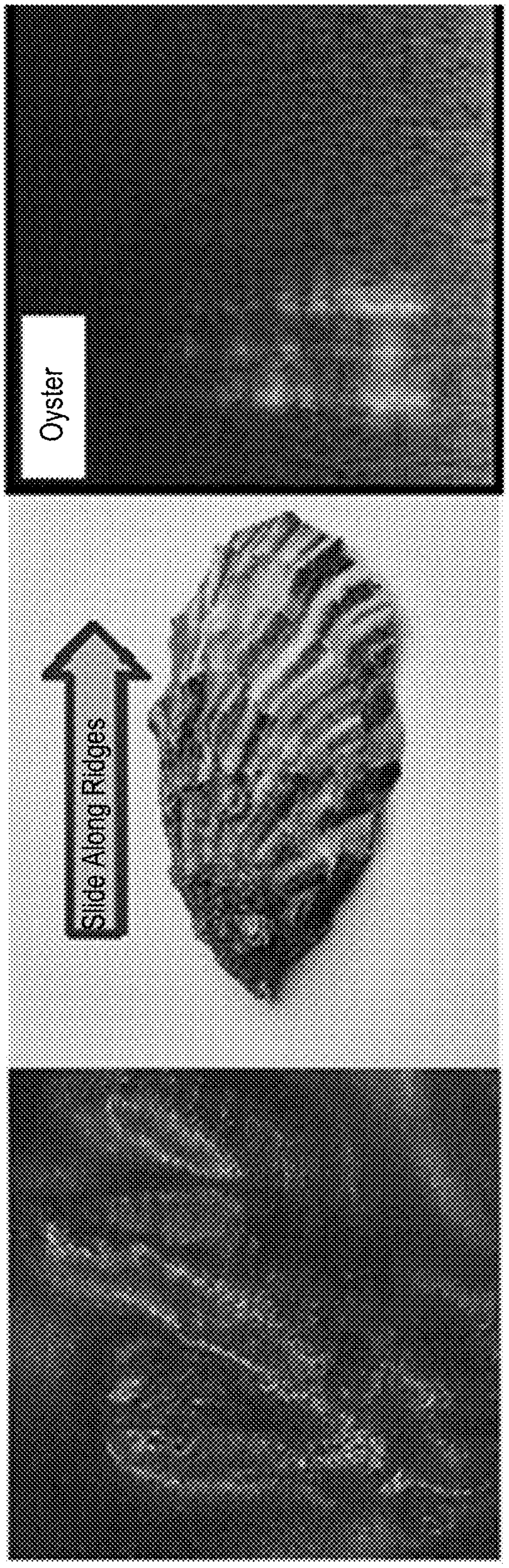
FIG. 3B illustrates example spectrogram of the surface audio textures recorded for different objects.
Figure 3B:
Figure 3B:
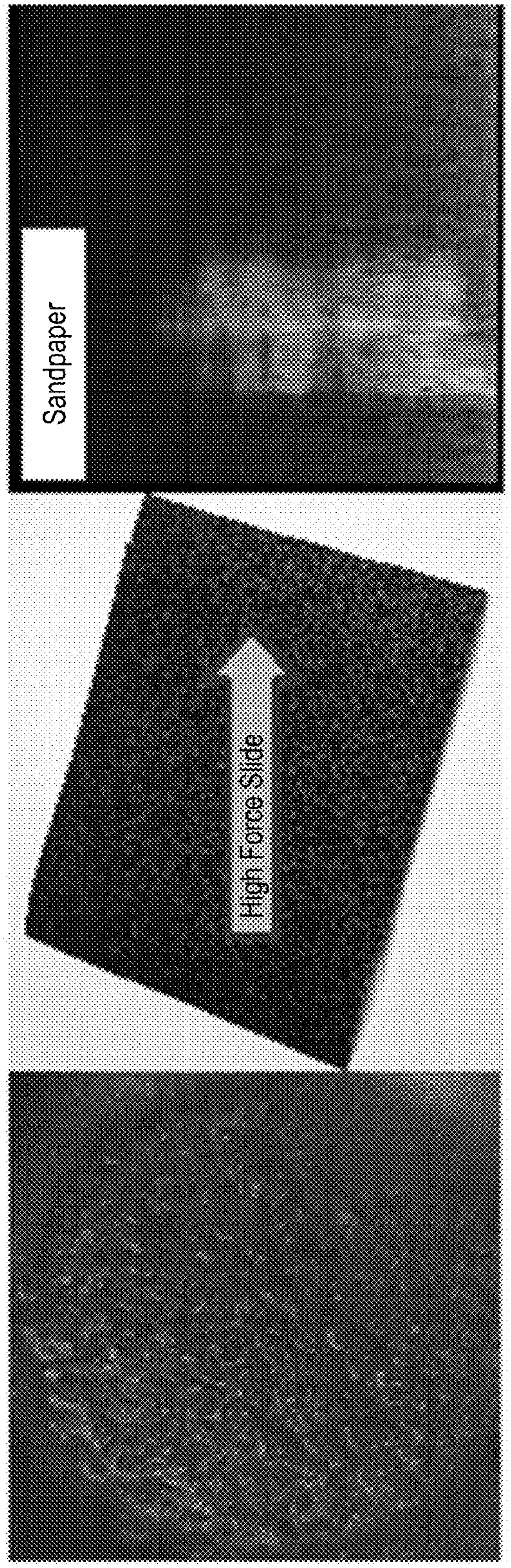
Figure 3C:
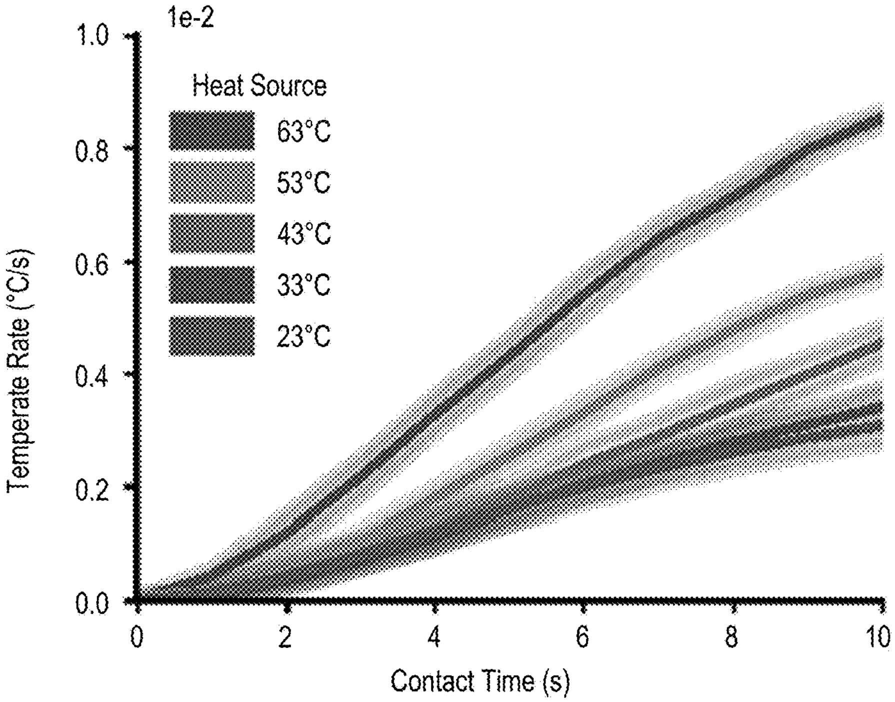
FIG. 3C illustrates example sensitivity of the artificial fingertip towards heat gradients.
Figure 3D:
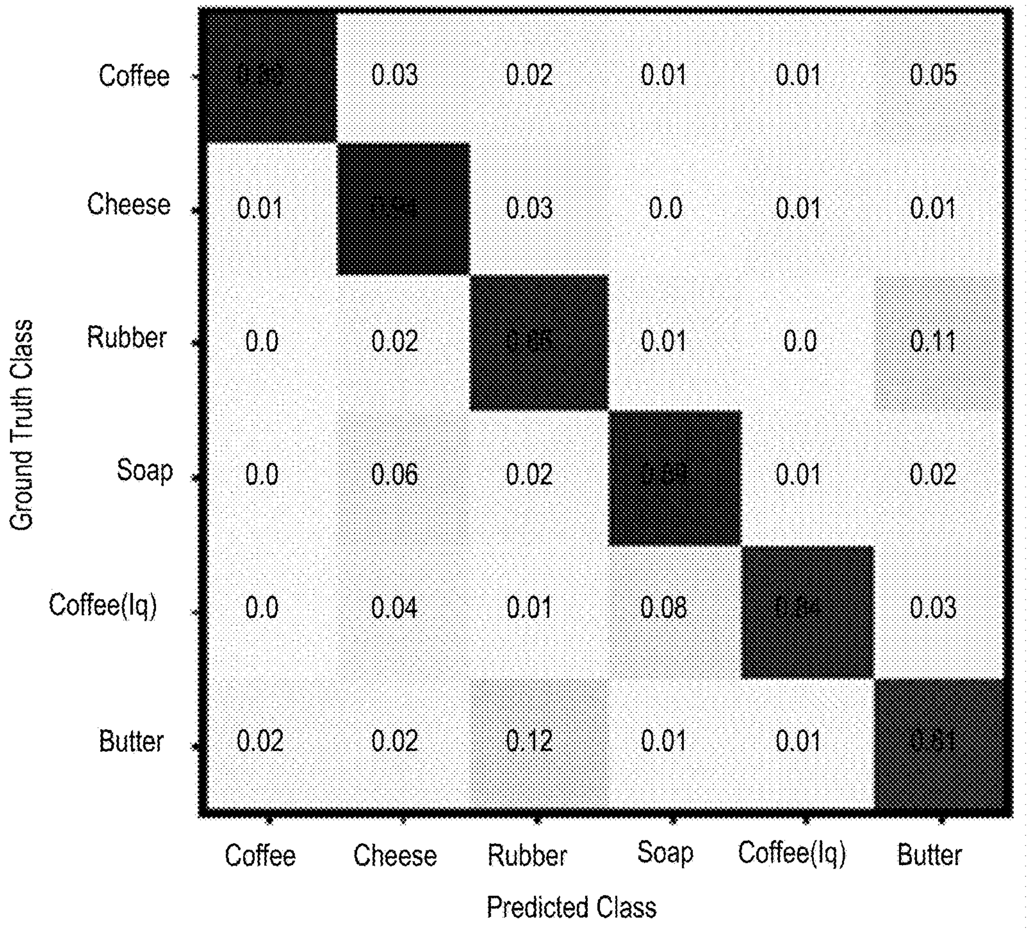
FIG. 3D illustrates example accuracy of object identification through local gas sensing.
Figure 3E:
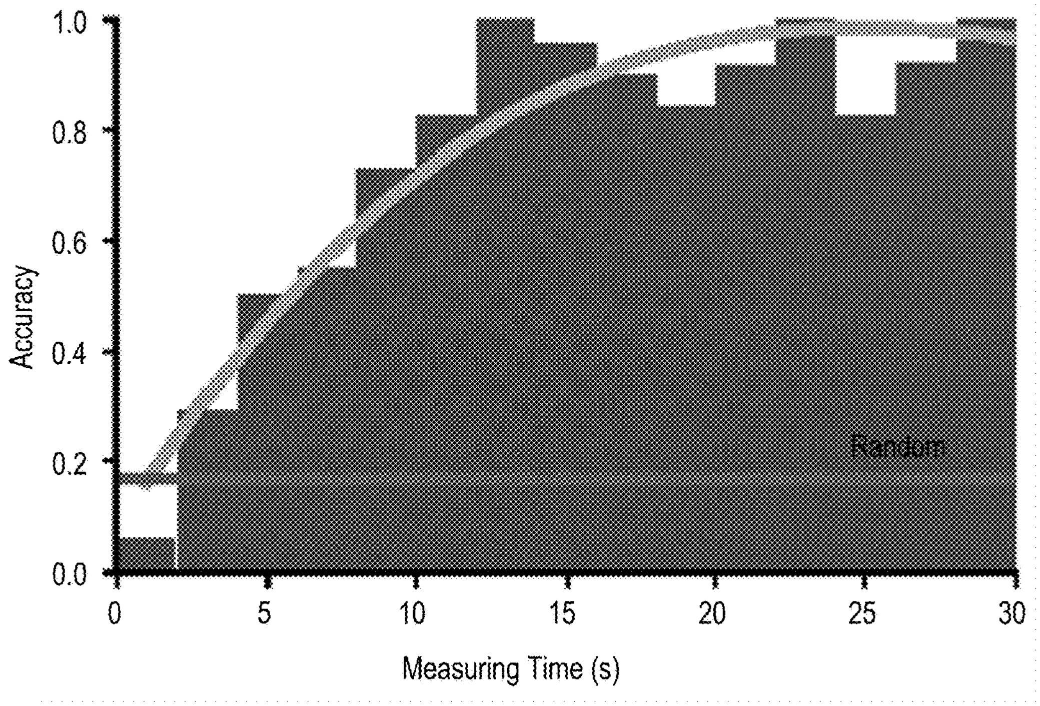
FIG. 3E illustrates example accuracy of object classification through scent.
Figure 3F:
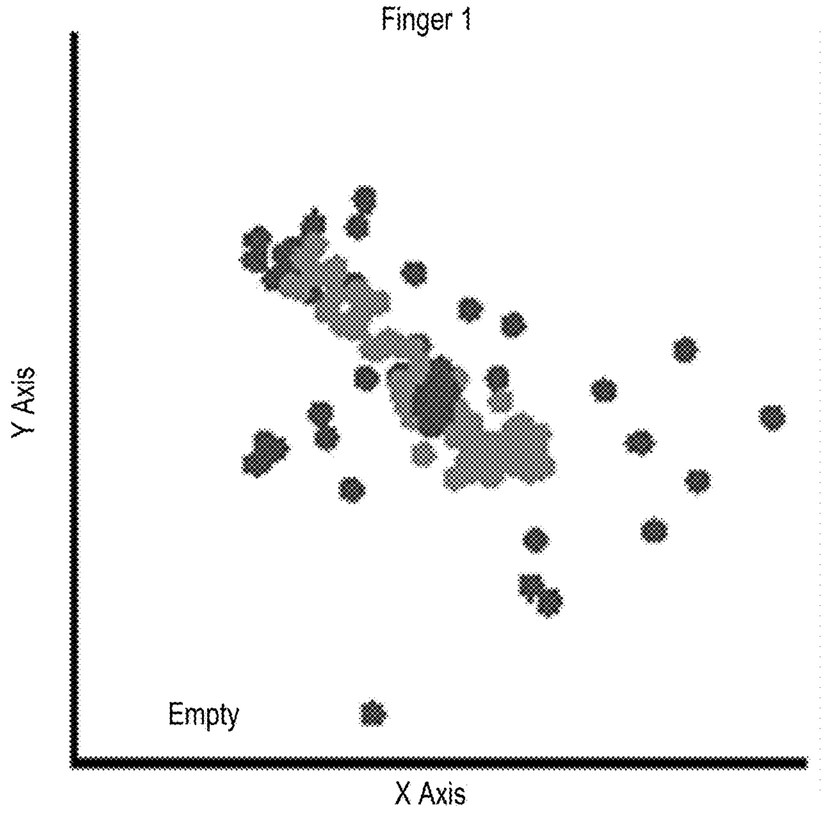
FIG. 3F illustrates an example localization of finger placement on an object during movement transients with empty and full volumes of liquid.
Figure 3F:
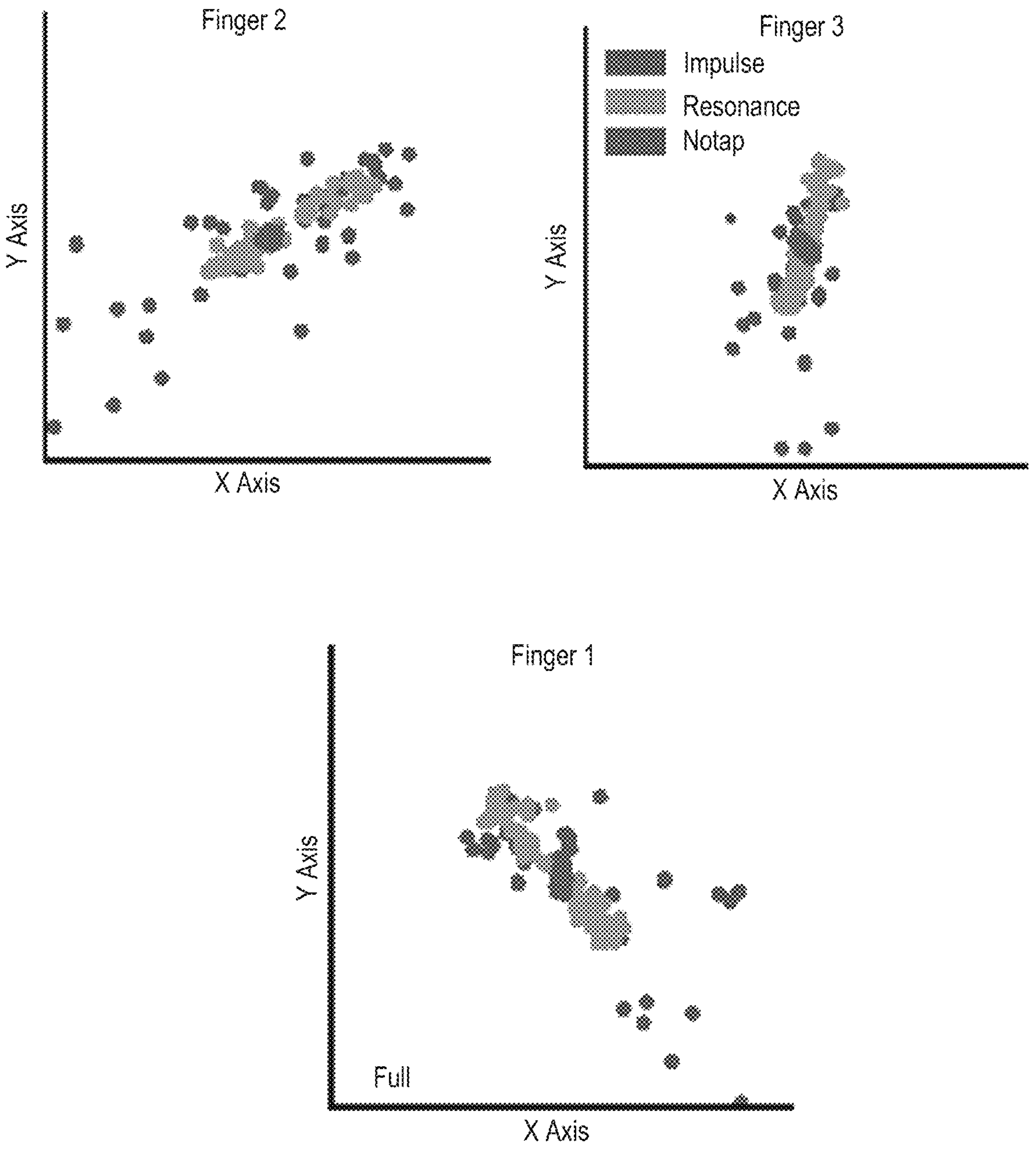
Figure 3F:
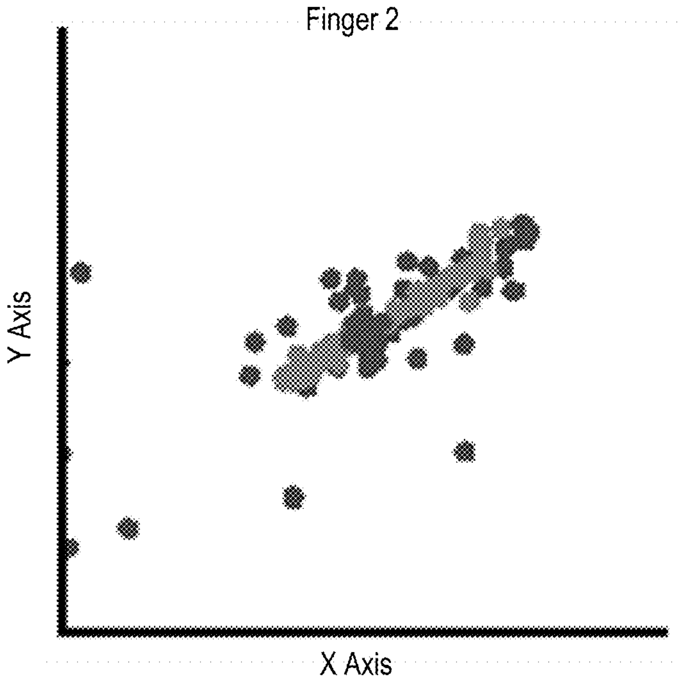
Figure 3F:
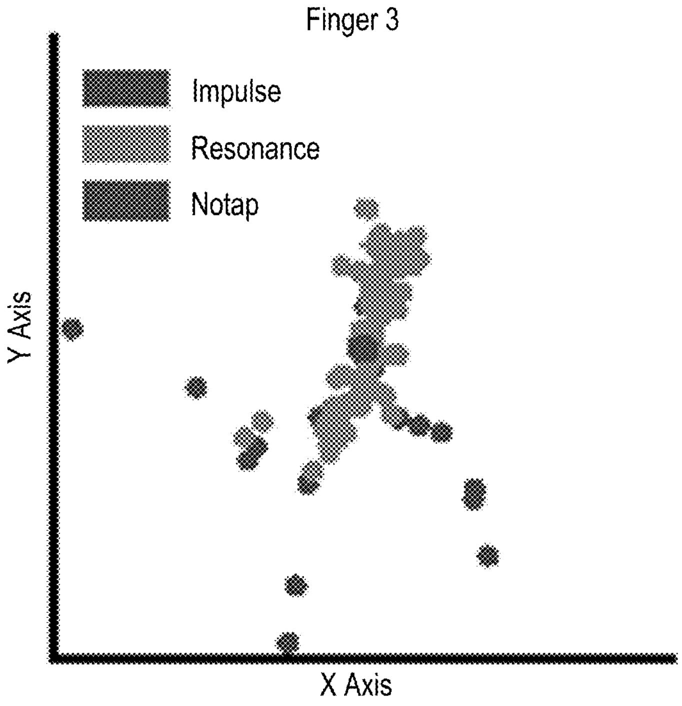

FIG. 3A illustrates the ability to determine the volume of water in an opaque container by tapping with one finger and recording the response on the fingers in contact with the container. The embodiments disclosed herein further show how this modality may be deconstructed into peak frequency analysis, which may be independent of finger position, whereas the decay time may be dependent on finger placement. FIG. 3B illustrates example spectrogram of the surface audio textures recorded for different objects. FIG. 3C illustrates example sensitivity of the artificial fingertip towards heat gradients. Using a variable heat source as a control, the artificial fingertip may be sensitive towards heat gradients. FIG. 3D illustrates example accuracy of object identification through local gas sensing. The artificial fingertip may provide object state and identification of objects through local gas sensing achieving a 91% accuracy. FIG. 3E illustrates example accuracy of object classification through scent. The accuracy of object classification through scent may be dependent on the integration time as the artificial fingertip begins approaching the object. FIG. 2E shows that 61% accuracy is reached within 6 seconds. FIG. 3F illustrates an example localization of finger placement on an object during movement transients with empty and full volumes of liquid. The embodiments disclosed herein measure the effects transients during impulse, resonance during a static hold, and a static hold with no movement.

Particular embodiments may further evolve the capabilities of the platform to include sensitivity to non-vision based modalities. As an example and not by way of limitation, when in contact with the environment, dynamic forces and signals may be experienced; swiping the fingertip across a surface, or the very moment a contact transient or slip may occur. Particular embodiments may capture this information through in-fingertip audio microphones and pressure MEMS based sensors and show the ability to determine the level of liquid inside an opaque bottle (see FIG. 2A) and understand the nuances of surface texture between different objects at a much higher frequency (upwards to, e.g., 10 kHz) than visual capture (e.g., 240 Hz) (see FIG. 2B). Particular embodiments may further include modalities to understand object state, which is not necessarily a function of contact, but can provide priors in understanding touch through heat and smell. Such priors may estimate if an object may be slippery due to the presence of water, soap, or butter and if an object may present a danger to human-contact due to its temperature.

For human arc-reflex, quick reaction to input stimuli on the fingertip may benefit from the central nervous system instead of a round trip to the brain. Particular embodiments may utilize a similar local processing response on the artificial fingertip. As an example and not by way of limitation, particular embodiments may include within the form-factor of the fingertip a neural-network accelerator to process the sensory reading, and allow for direct control providing actions to a robotic end effector for controlling the phalanges of a robot finger. While this may be a new era of on-device fingertip processing, the embodiments disclosed herein disclose two main effects that contribute to faster response, i.e., latency and jitter. Latency may result from the average time required to process a signal of interest and jitter may be the variation in mean time-based on system overhead which may occur due to host processing or bandwidth constraints. Compared to conventional methods of using an artificial fingertip with an external host where 2× the round-trip latency is required to perform an action, the embodiments disclosed herein show that by processing data directly on device through an onboard neural network accelerator, a 2× reduction in latency and jitter towards performing an action may be achieved in an example embodiment.

In particular embodiments, a 3D finite element method (FEM) model using Comsol Multiphysics may be utilized for analyzing and characterizing the fingertip material stack-up. The 3D FEM model may identify the sensitivity and resolution of the sensor. First, a FEM model may be used to identify the key parameters that presented the largest change in sensitivity and resolution. Since the fingertip may be isotropic and may revolve around the origin, only a quarter of the sensor may be modeled for faster computation, using a multi-layer based model. The multi-layer model may comprise the base gel, polymer, and coating layers.

Particular embodiments may use a particular system to generate nano-mechanical characterization of the fingertip polymer Young's modulus, E. This system may have in-situ high-resolution imaging, dynamic nanoidentation and a high-precision motion stage with high-resolution force sensing tips. As an example and not by way of limitation, for characterization, a 30 μN force may be applied with a 10 um probe tip. The corresponding force displacement curve may be measured yielding a Young's modulus of, e.g., E=2.86 MPa. Using the experimental E value, the FEM models may be updated to correct the simulations. Furthermore, the same force value applied and maximum displacement, Dmax, may be measured, resulting in the verification of simulation, Dmax=2.1 um as an example and experimental Dmax=2.2 um measurement results as an example, with an example error ≤5%. Additionally, multiple measurements may be taken across varying samples of the fingertip. For example, an average value for E may be measured at E=2.6±0.74 MPa. Both Emean and Estd may be used in detailed analysis for the total E range in the FEM models.

Figure 4:
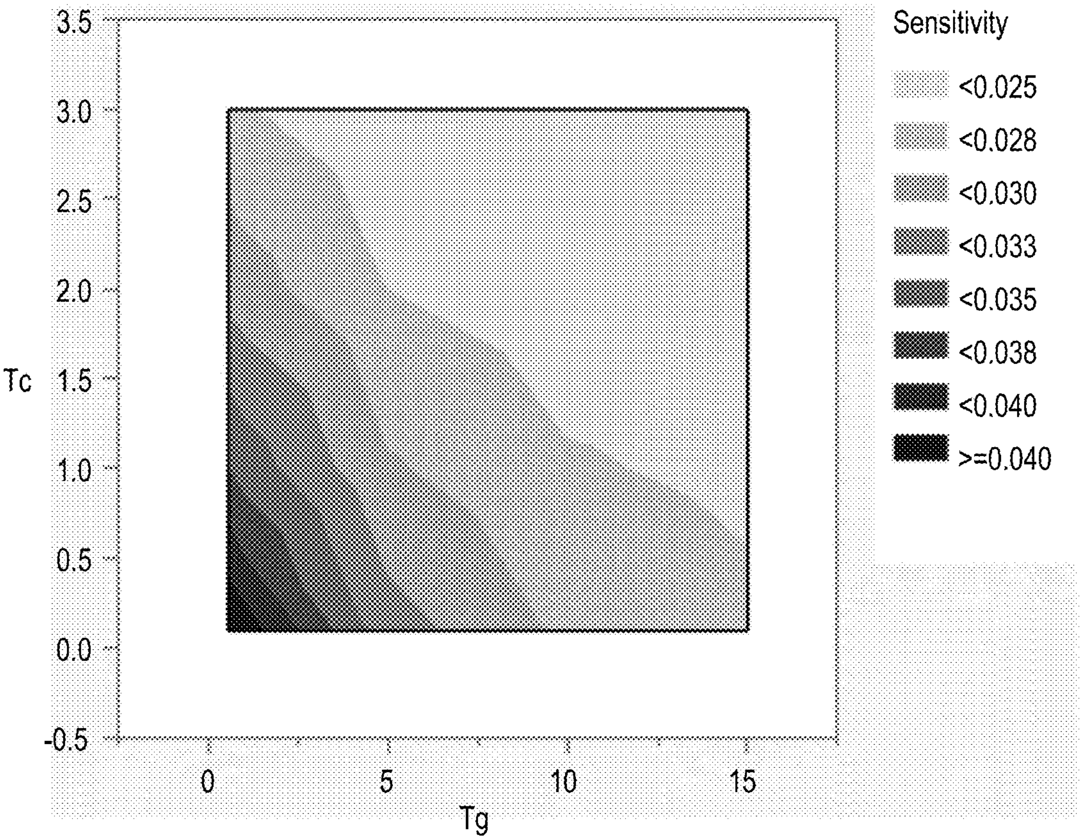
FIG. 4 illustrates an example touch sensitivity surface map plot of Ec=5.0 and Eg=3.0 MPa.
Figure 5:
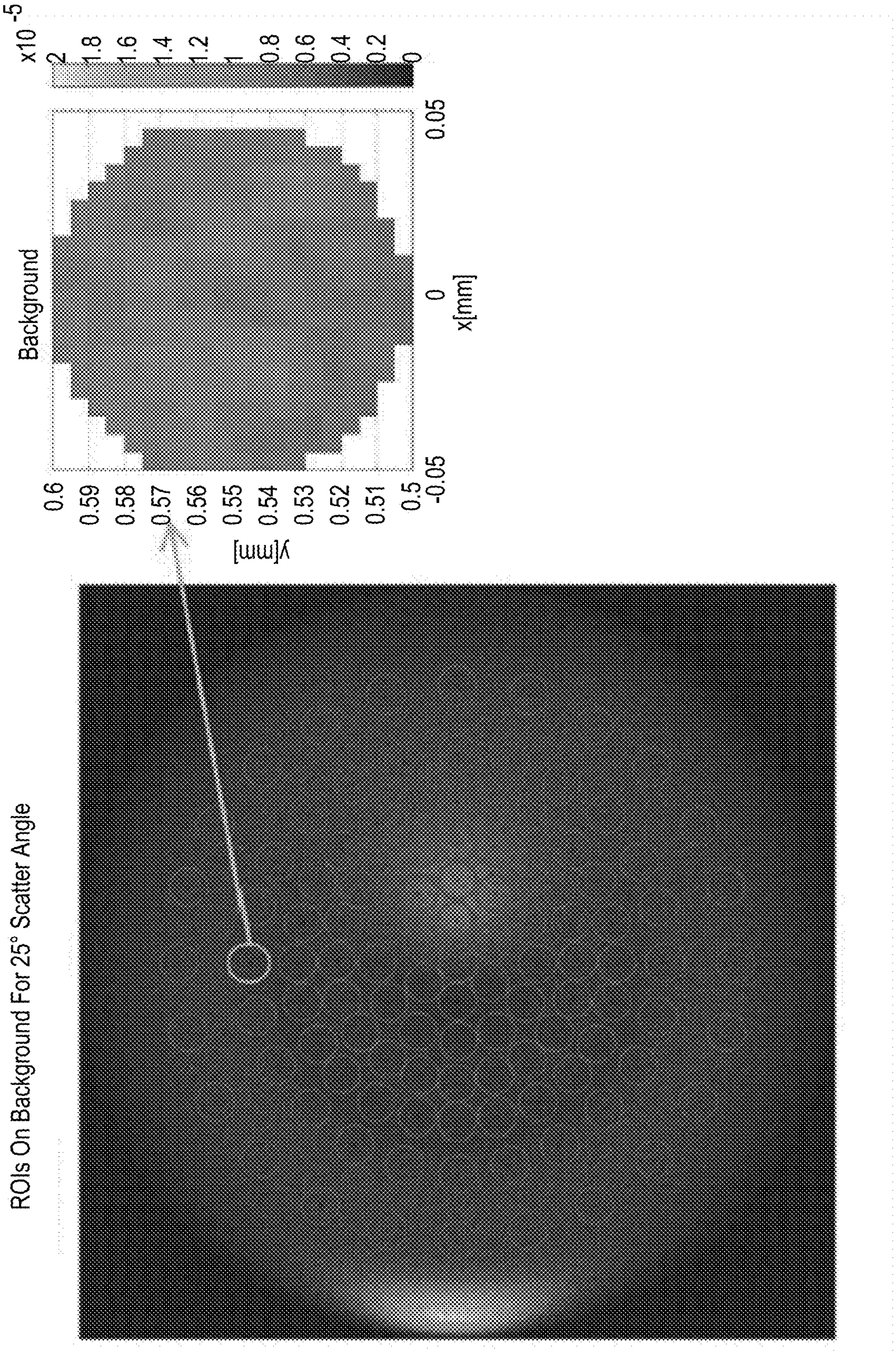
FIG. 5 illustrates an example visualization of the result of FEM analysis with surface map graphs.
Figure 5:
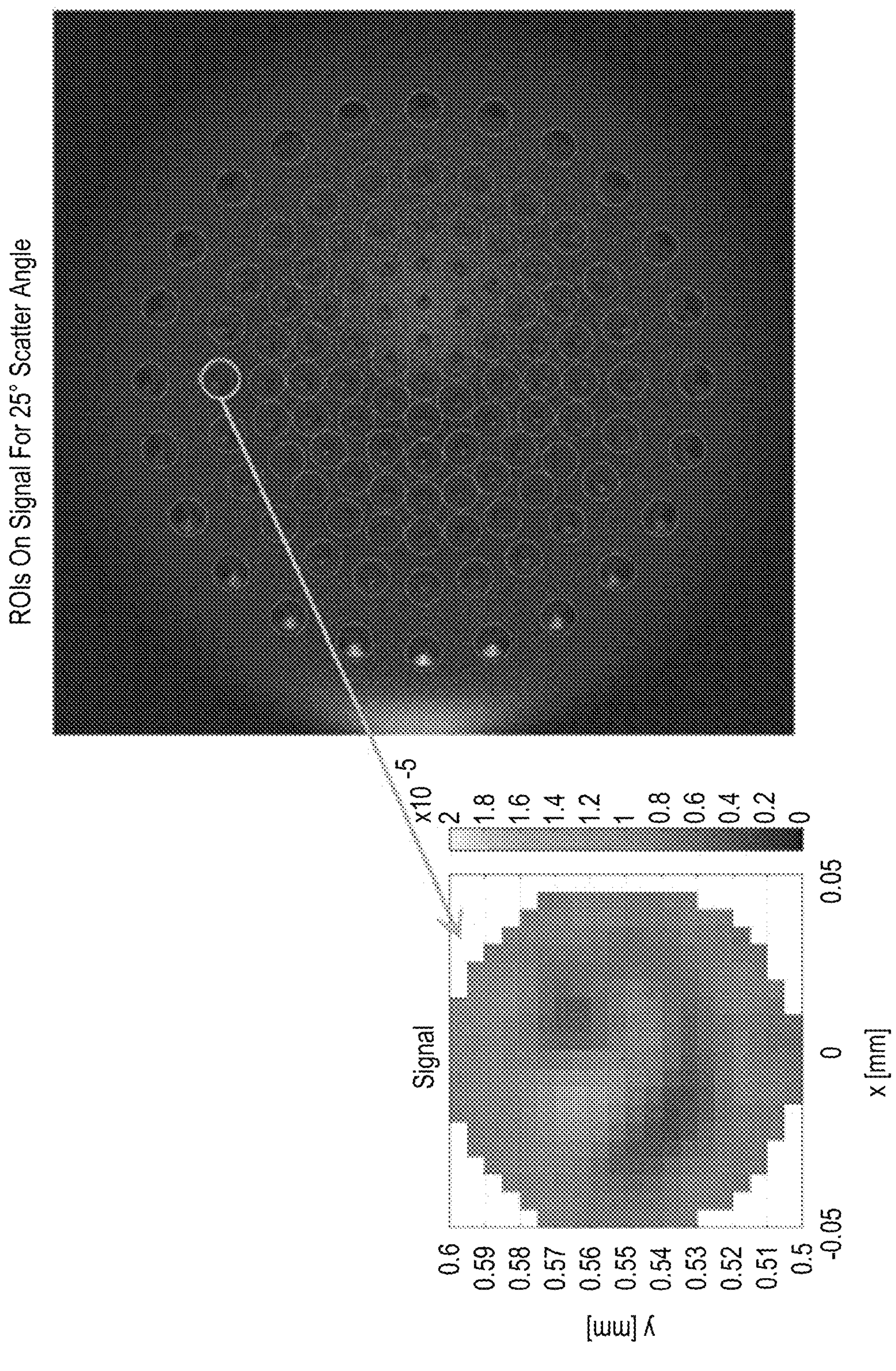

Particular embodiments may further employ design-of-experiments techniques used to identify key parameters in affecting sensor sensitivity. As an example and not by way of limitation, six different parameters may be used: Rgel (gel radius), Tc (coating layer thickness), Tg (gel layer thickness), h (height), Ec (coating Young's modulus), Eg (gel Young's modulus). In particular embodiments, materials associated with the silicone hemispherical dome may be determined based on a plurality of material parameters comprising one or more of gel radius, coating layer thickness, gel layer thickness, height, coating Young's modulus, or gel Young's modulus. Entertaining a full factorial design of 6 parameters may lead to 64 models, thus a quarter-factorial design method may be used to reduce the design into 16 models. Analysis of variance and prediction analysis may result in Ec and Eg as main effects and interactions with coating and gel thicknesses. Hence, the parameters height h and gel radius Rgel may be removed from the model. To analyze the effect of gel and coating thickness, Tg, Tc on the sensor performance, design-of-experiments methods may be used through sweeping Young's modulus parameters, Ec, Eg, and thickness parameters, Tg and Tc. For example, for the protective fingertip layer's Young's modulus, values of Ec,g=0.5, 1.0, 3.0, 5.0 MPa may be used. As another example, for the values of coating thickness, Tc=0.1, 0.5, 1.0, 2.0, 3.0 mm and for gel thickness, Tg=0.5, 1.0, 5.0, 10, 15 mm may be used. FIG. 4 illustrates an example touch sensitivity surface map plot of $E_c$=5.0 and $E_g$=3.0 MPa. FIG. 4 shows that for decreasing gel and coating thickness, sensitivity increases. FIG. 5 illustrates an example visualization of the result of FEM analysis with surface map graphs. FIG. 5 shows selecting regions of interest for background and indentation with multi-contact indentations across the surface of the fingertip, where the x-axis shows gel thickness, Tg values and y-axis show coating layer thickness, Tc for each combination of coating and gel Young's modulus, Ec and Eg. FIG. 5 indicates that the material Young's modulus may contribute significantly to yield a minimum required Tc and Tg for high performance. Similar FEM analysis was performed for the example conventional tactile sensor. A multilayer-based model may be used. The embodiments disclosed herein analyzed Tg (gel thickness), Tc coating thickness, Ec (coating Young's modulus) and Eg (gel Young's modulus). For example, a parametric study was performed with Tg 0.5 to 15 mm with 0.25 steps and Tg 0.1 to 3 mm with coating Young's modulus Ec 5 MPa and gel's Young's modulus Eg 1 MPa. The result of this study shows that gel and coating thickness interact, and the coating and gel thickness combination may affect the overall sensitivity of the sensor.

Figure 6:
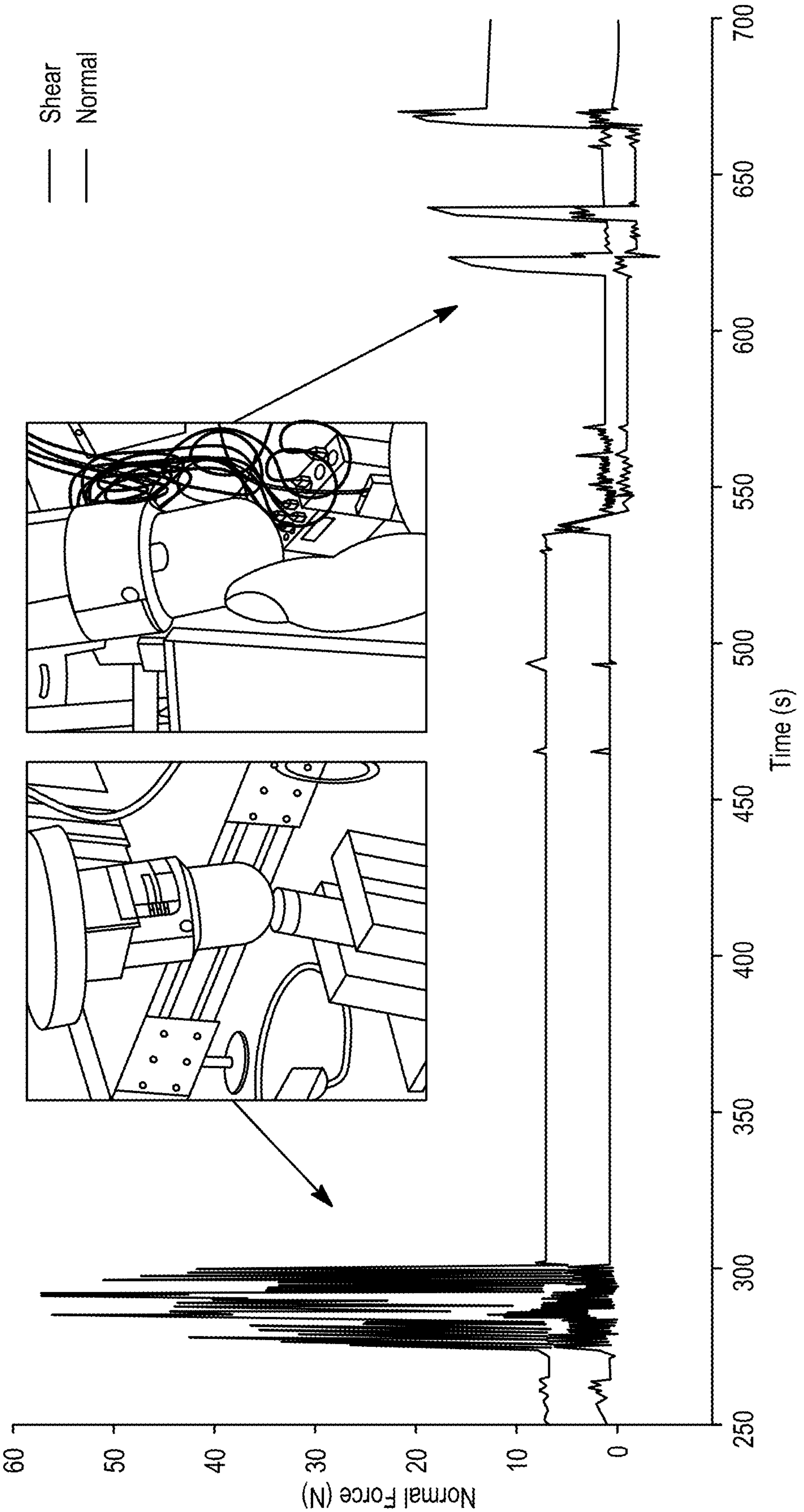
FIG. 6 illustrates example maximum normal and shear force applied to the artificial fingertip surface prior to detachment from the main body.

Particular embodiments may determine average and maximum forces which can be applied to the fingertip before the soft hemispherical surface is damaged. Particular embodiments may fix the sensor to a force-torque sensor and apply an increasing force until the fingertip detaches from the body, which may occur at, for example, 40 N and 20 N for normal and shear forces respectably. FIG. 6 illustrates example maximum normal and shear force applied to the artificial fingertip surface prior to detachment from the main body. Particular embodiments may apply an incremental normal and shear force to the body of the soft artificial fingertip and record the ground truth force data from a stationary force-torque sensor. When an abrupt change occurs, this may indicate that maximum force has been reached.

Reflecting on FEM simulations, Young's modulus may be an important parameter in sensor performance to input stimuli, and may require precise controller measurement. In addition to nanoindenter measurement, which is point-based measurement, a set of dynamic mechanical thermal analysis (DMTA) measurements may be performed to obtain the global Young's modulus of the gel. With this method, particular embodiments may measure the viscoelastic properties of polymers. During DMTA measurements an oscillating force may be applied to the material, and its response may be recorded to calculate the viscosity and stiffness of the material. The oscillating stress and strain measurements may be important in determining the viscoelastic properties of the material.

When oscillating force is applied, sinusoidal stress and strain values may be measured. The phase difference between sinusoidal stress and strain may provide information about viscous and elastic properties of the material. Ideal elastic systems may have a 0° C. phase angle while viscous systems may have a phase angle of 90° C. Additionally, elastic response of a material may be similar to storage energy and may be captured by storage modulus, while the viscous response may be considered as loss of energy, captured by loss modulus. Thus, the overall modulus of the viscoelastic material may be the combination of elastic and viscous components; in other words, summation of storage modulus and loss modulus. Another value, tan δ, may be used to compare the viscous and elastic moduli. DMTA may measure the change in the elastic modulus, loss modulus and tan δ with respect to temperature. As the viscosity of the material is affected by the temperature and time, usually DMTA experiments may be performed at different temperatures and frequencies. Particular embodiments may use a common approach to select the operational conditions of the materials. Hence, for ideal sensitivity the fingertip may be expected to be used at room temperature and low frequency. As such, DMTA measurements may be taken at 25° C. with frequency 5 Hz in an example embodiment.

During fingertip manufacturing, different combinations of polymers with varying shore values may be evaluated. For example, to identify the global Young's modulus and effect of different gel mixtures, DMTA measurements may be done at 25 degC with frequency 5 Hz, shown in Table 1. Fingertip materials with lower Young's modulus may be preferred in order to optimize for higher sensitivity. Particular embodiments may select a fabrication using a particular silicone encapsulating rubber using, e.g., a 0.8:1 (part A to B) ratio for the gel fingertip base material, and another particular cured silicon rubber as thin protection layer for the thin-film layer.

TABLE 1

DMTA measurements performed on typical polymers used in fingertip gel manufacturing.

| Polymer | Shore | Storage Modulus | Loss Modulus | tan δ |
|---|---|---|---|---|
| Sorta Clear 12 | 12 | 31.2 | 2.9 | 0.09 |
| Sorta Clear 18 | 18 | 65.1 | 8.2 | 0.12 |
| Solaris | 15 | 38.5 | 1.8 | 0.048 |
| Encapso K | 33 | 56.1 | 6.6 | 0.11 |
| Ecoflex Gel | 32 | 0.66 | 0.41 | 0.61 |
| Ecoflex 0010 | 10 | 1.11 | 0.32 | 0.29 |
| Ecoflex 0020 | 20 | 0.92 | 0.15 | 0.16 |
| Ecoflex 0030 | 30 | 1.17 | 0.13 | 0.11 |
| Ecoflex 0035 | 35 | 2.3 | 0.14 | 0.06 |
| Ecoflex 0050 | 50 | 1.55 | 0.19 | 0.12 |
| Ecoflex 0045 | 45 | 5.7 | 0.43 | 0.07 |
| Solaris A:B 0.9:1 | N/A | 30.7 | 1.24 | 0.04 |
| Solaris A:B 0.8:1 | N/A | 28.3 | 1.05 | 0.037 |

In particular embodiments, the silicone hemispherical dome may be generated based on manufacturing a mold from aluminum, finishing the mold with a machine polishing pass, preparing the mold for gel casting through a salinization process in a desiccator, preparing a gel material using a cure silicone rubber compound, combining the gel material in a speed mixer under vacuum, casting the gel material into the mold, curing the casted gel material at a first temperature for a first amount of time, and removing a gel hemispherical dome from the mold once the casted gel material is cured. As an example and not by way of limitation, particular embodiments may manufacture the fingertip molds from 6061 aluminum and finish them with a machine polishing pass with a 3 mm diameter tool and a 50 μm step-over. The molds may be then prepared for gel casting through a silanization process in a desiccator with 50 μL silane under vacuum for 30 min. Following this, the gel material may be prepared using a 1:1 ratio of the aforementioned silicon encapsulating rubber and combined in a speed mixer for 3 minutes under vacuum to release any captured air in the sample. The gel material may be then cast into the mold and allowed to cure at 23° C. for 12 h. Once cured, the gel fingertip may be removed from the mold using tweezers for transfer to a glass slide.

In particular embodiments, the reflective silver-film layer may be generated based on preparing a glucose solution by dissolving a first amount of glucose in a second amount of $H_2O$ and adding a third amount of KOH, preparing an $AgNO_3$ solution by dissolving a fourth amount of $AgNO_3$ in a fifth amount of $H_2O$ and adding a sixth amount of $NH_3$, preparing a plating solution by mixing the glucose solution and $AgNO_3$ solution, cleaning the gel hemispherical dome using oxygen plasma for a second amount of time, activating the gel hemispherical dome in a solution of a seventh amount of $SnCl_2$ in an eight amount of $H_2O$ for a third amount of time, suspending the gel hemispherical dome into the plating solution for a fourth amount of time, rinsing the gel hemispherical dome with $H_2O$, and air drying the gel hemispherical dome. As an example and not by way of limitation, the steps for preparing the thin film metallic reflective layer on the gel fingertip through silver plating may be as follows. First, a glucose solution may be prepared by dissolving 2.035 g glucose in 160 mL $H_2O$ and then adding 0.224 g KOH. This may be set aside and the $AgNO_3$ solution may be prepared by dissolving 1.02 g $AgNO_3$ in 120 mL $H_2O$, and then adding 1.2 g $NH_3$ 25%. The plating solution which is used to silver coat the gel fingertip may be then prepared by mixing 2 parts glucose solution, total 80 mL, to 1 part $AgNO_3$ solution, total 40 mL. The silvering solution may be then set to gently stir. Prior to silver coating, the gel fingertip may be cleaned using oxygen plasma for 3 minutes. The gel fingertip may be then activated in a solution of 6.181 g $SnCl_2$ in 98 mL $H_2O$ for 10 s. Once the gel fingertip is activated, it may be suspended into the silvering solution for a total of 3 minutes, then rinsed with $H_2O$ and air dried. This process may create a silvered reflective layer with 6 μm thickness. For robotics applications, and for increasing resilience against the intrusion of ambient light, particular embodiments may coat the silvered layer in a white or black layer. This layer may be produced by using the aforementioned cured silicon rubber, a mixing ratio of part A to B of 1:1 and then adding 3% silicon color pigments to part A of the aforementioned cured silicon rubber. Part B of the cured silicon rubber may be then mixed in by weight according to the mixing ratio specified previously and then mixed in the speed mixer for 3 minutes under vacuum. The silvered gel fingertip may be then dipped into the pigment of the cured silicon rubber and set to cure for 6 hours.

Common vision-based tactile sensors may make use of a static illumination configuration whereas some other sensors may use a single light color with colored acrylic to simulate multiple colors. Static illumination may be not ideal to promote a modular system. Rather, the illumination system should adapt to the needs of extracting information from the touch surface. Some conventional tactile sensors used a gel coated with a Lambertian scattering layer, in which volume illumination may produce an image by means of scattering light off the surface and into the vision system. In the case of the monolithic hemispherical gel dome used in the artificial fingertip disclosed herein, the embodiments disclosed herein determine that Lambertian scattering may be not ideal for producing and optimizing for force and spatial sensitivity. Additionally, the embodiments disclosed herein introduce a dynamic illumination system that provides volume illumination with configurable wavelength, intensity, and positioning. As an example and not by way of limitation, the illumination system may comprise 8 fully controllable RGB LEDs that emit Lambertian diffuse light, equally spaced around a circle of radius 9 mm.

Figure 7:
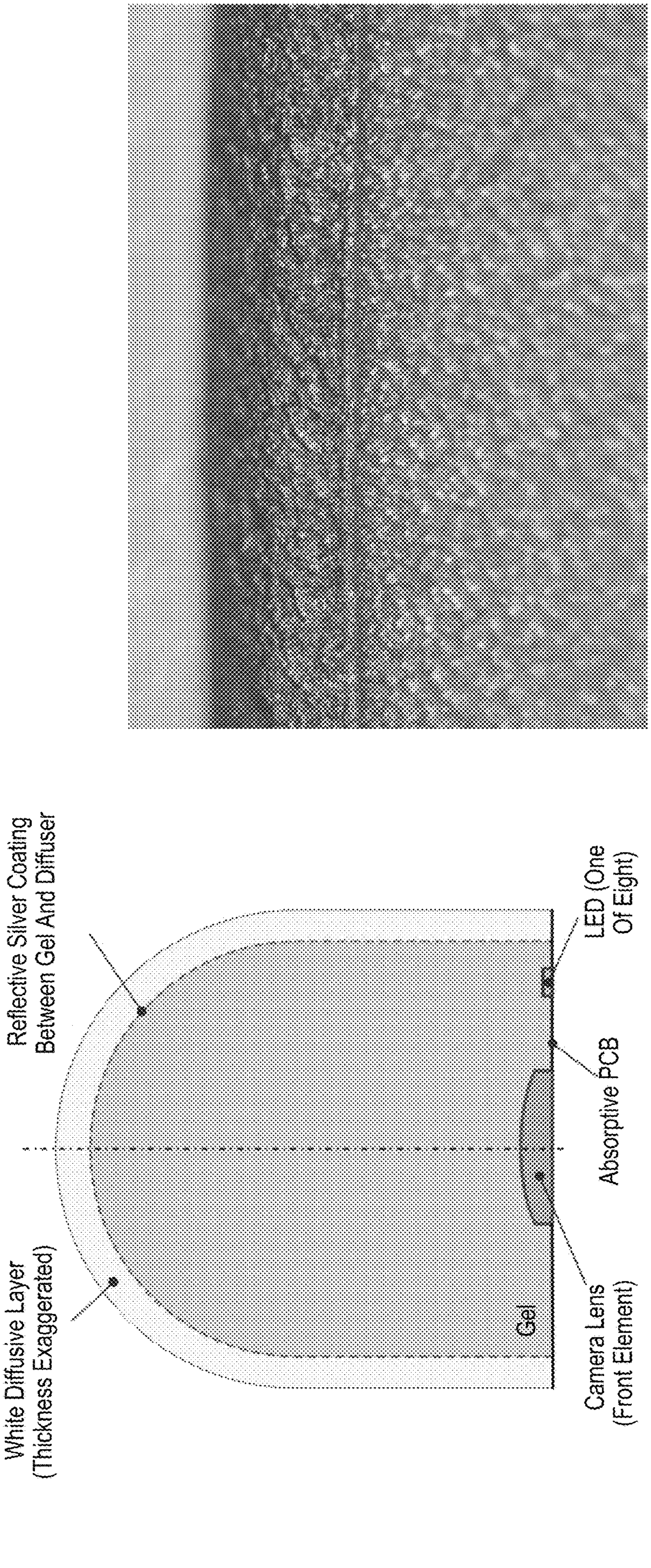
FIG. 7 illustrates an example cross-section of the fingertip gel coating showing the 3 layers: outer, silver and base gel.
Figure 8A:
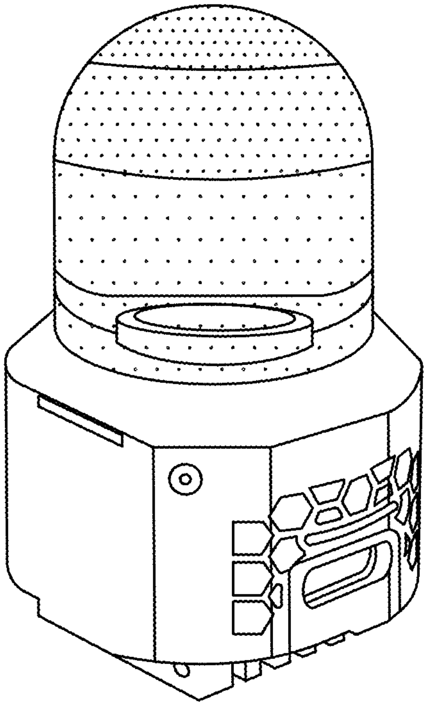
FIGS. 8A-8H illustrate example hyperfisheye lens designed specifically for capturing omnidirectional tactile sensing images.
Figure 8B:
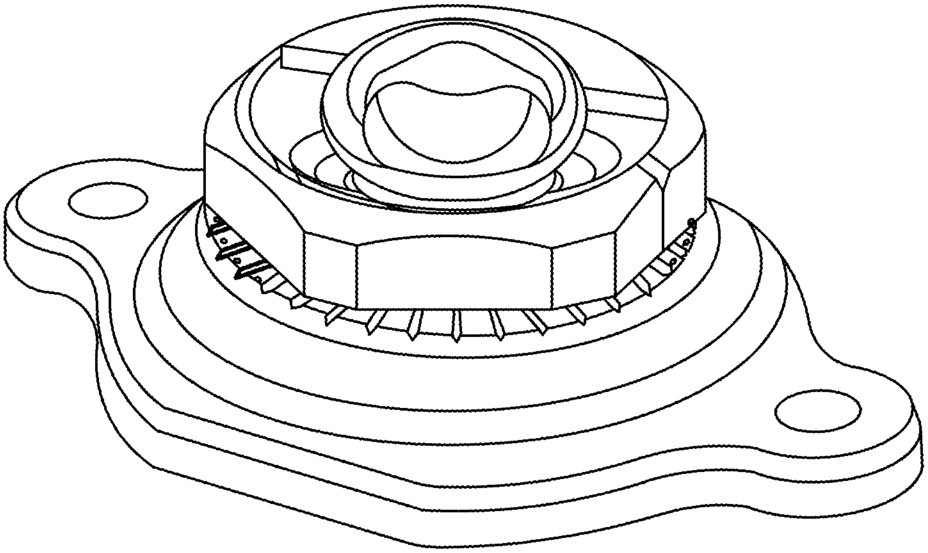
Figure 8C:
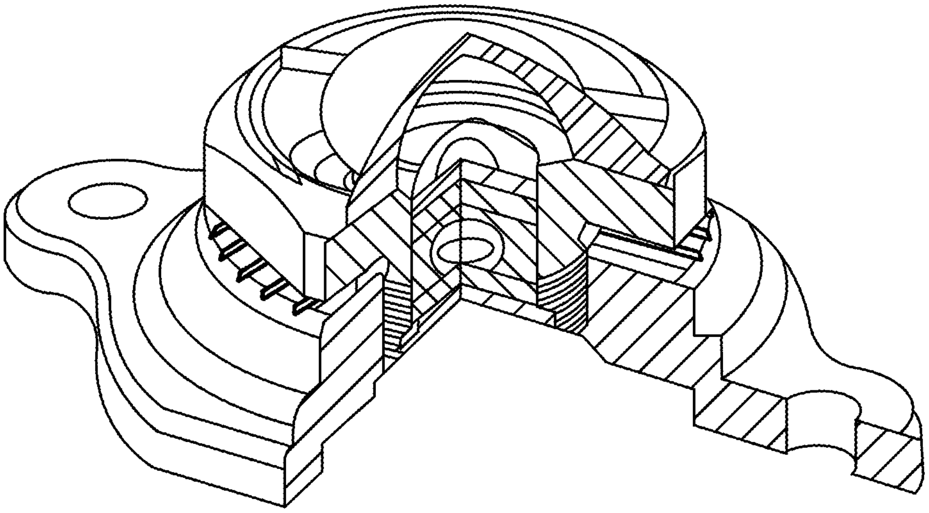

FIG. 7 illustrates an example cross-section of the fingertip gel coating showing the 3 layers: outer, silver and base gel. FIGS. 8A-8H illustrate an example hyperfisheye lens designed specifically for capturing omnidirectional tactile sensing images. FIG. 8A illustrates example fingertip regions of the hyperfisheye lens. Three regions of interest may be selected for optical system performance, tip, prominent contact surface, and base. The fingertip gel in the system disclosed herein may comprise three components, as seen in FIGS. 7-8. The outer surface of the base gel may have a reflective silver thin-film coating, which may be coated with a protective colored-diffusive material. To produce an image, the two layers may provide scattering of internally incident light from surface interactions to the vision system. Particular embodiments may place the illuminating light-emitting diodes in optical contact to the gel, using an over-molding process. The fingertip gels may be manufactured with a smooth and polished surface initially, and through mold texturing one may control and determine how light is scattered at the interface. FIG. 8B illustrates an example lens of the hyperfisheye lens. FIG. 8C illustrates an example lens cutaway of the hyperfisheye lens.

Figure 8D:
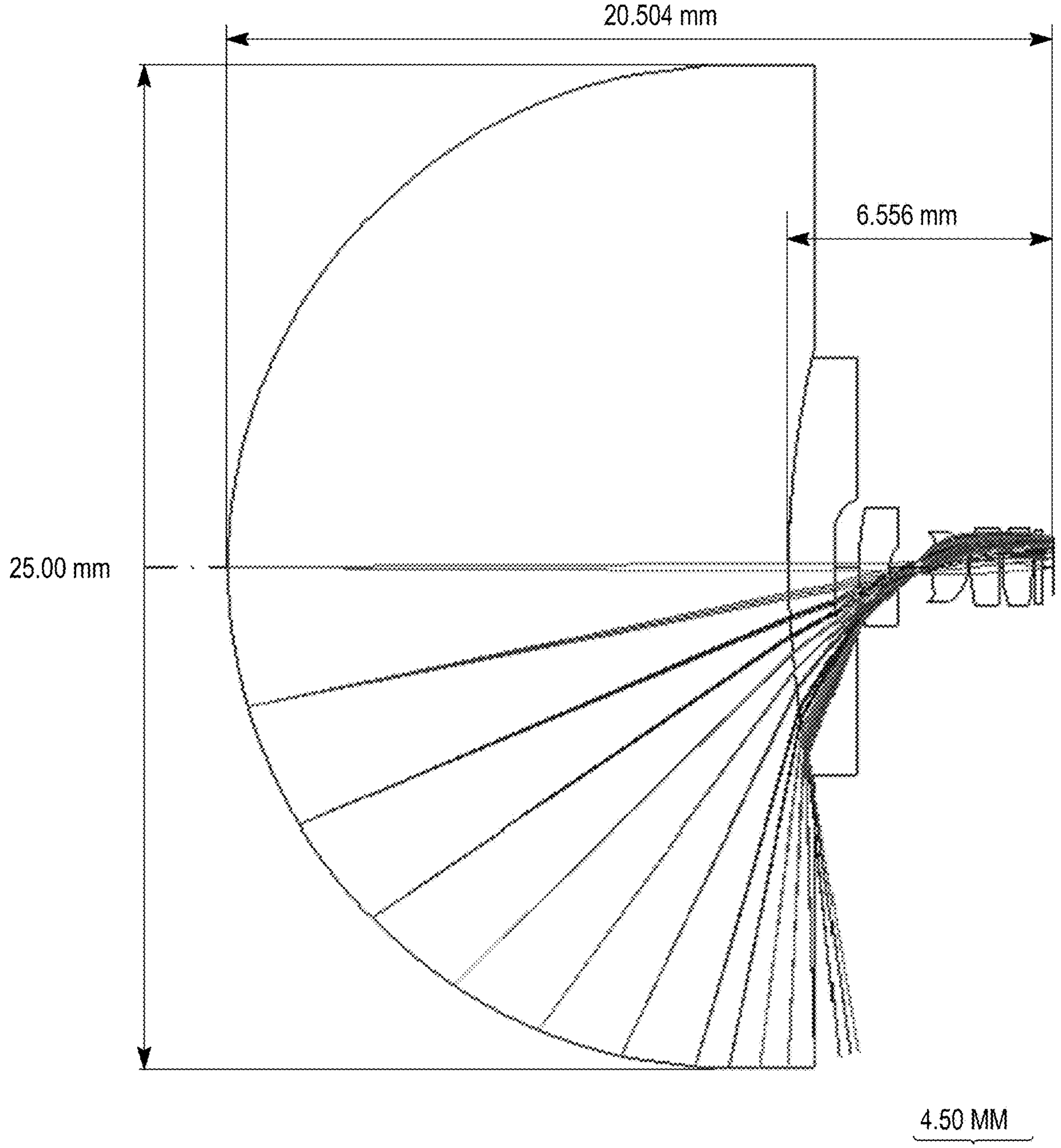
Figure 8E:
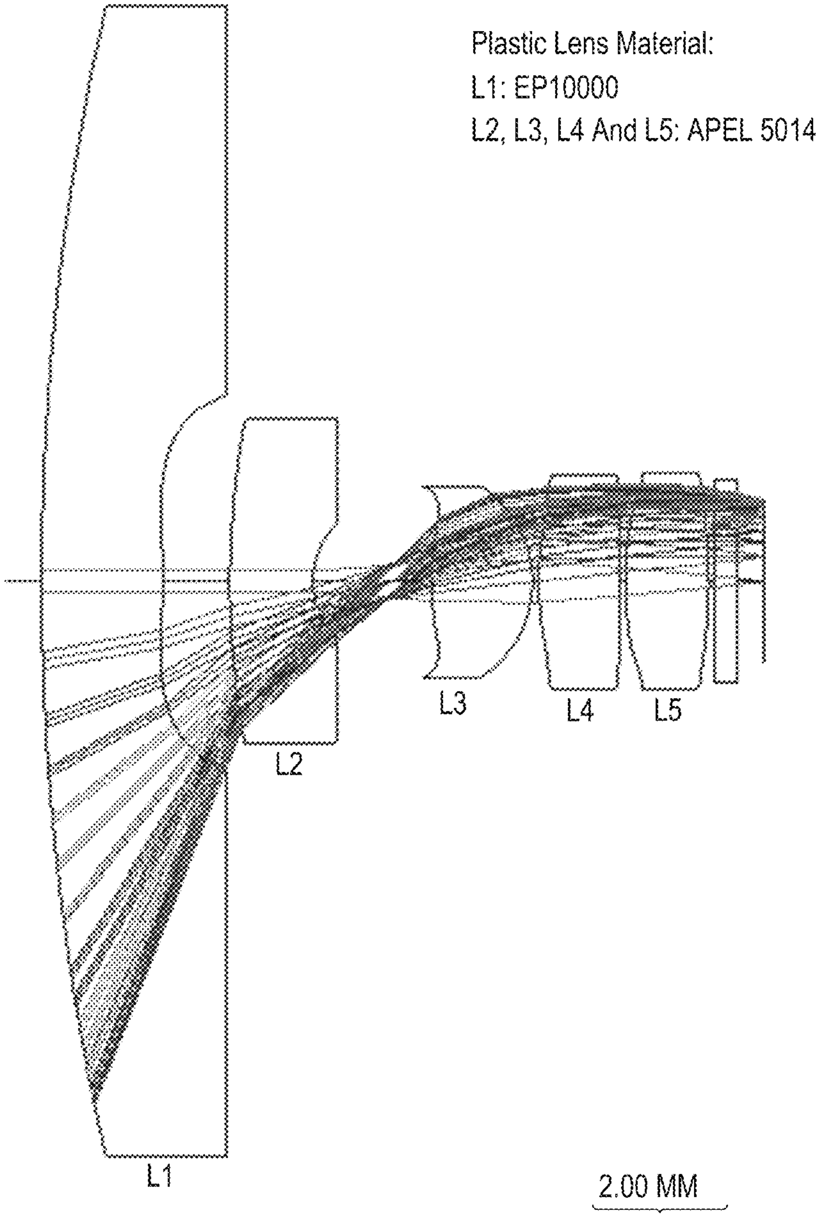

FIG. 8D illustrates an example system layout of solid immersion hyperfisheye lens system. For example, the design configuration comprises a 25-mm diameter silicone hyper-hemispherical dome in tandem with a 5P lens system. This silicone-lens system combination images object points located at or near the dome surface to the sensor plane. For example, the imaging system has EFL=1.57 mm, FOV of 194.5 degrees, and focal ratio of F/3.68 at the used conjugates. The image quality evaluation performance of these designs at 1=587.6 nm, in terms of MTFs, spot sizes, relative illumination and wavefront analysis are shown in the following slides. FIG. 8D also shows the lens system sizes/dimensions. FIG. 8E illustrates an example lens layout and lens element plastic material. The lens system may utilize EP10000 plastic material for the L1 lens element while lens elements L2, L3, L4, and L5 are designed using APEL 5014 plastic material.

Figure 8F:
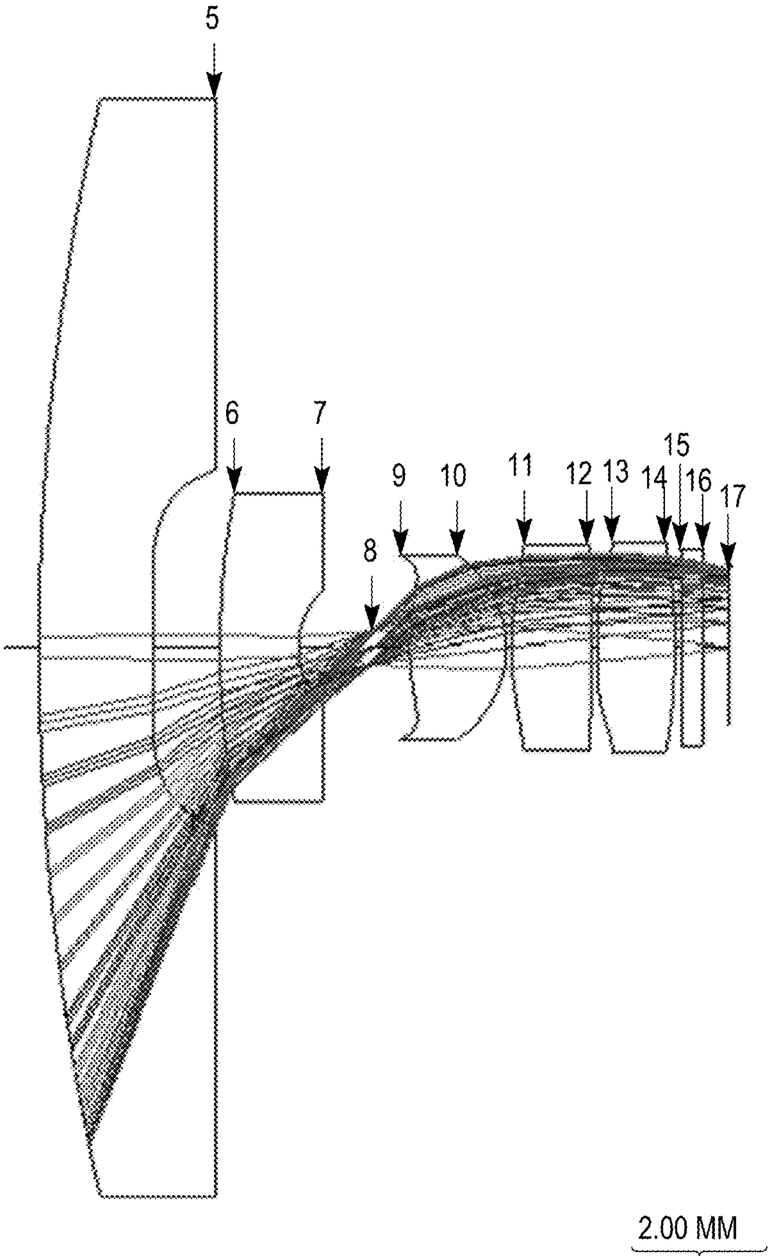

FIG. 8F illustrates an example lens layout and minimum clear aperture radii. In particular embodiments, the first lens element may be configured to have a maximum clear aperture diameter of 10 millimeters. As shown in FIG. 8F, lens element L1 may have a maximum clear aperture diameter of 10 mm and in contact (no air space) with the hyper hemispherical silicone dome element. FIG. 8F also shows additional example clear aperture data (based on radius in millimeter) as: CIR S4 4.748376, CIR S5 1.707403, CIR S6 1.341748, CIR S7 0.538351, CIR S8 0.151529, CIR S9 0.574821, CIR S10 0.794950, CIR S11

Figure 8G:
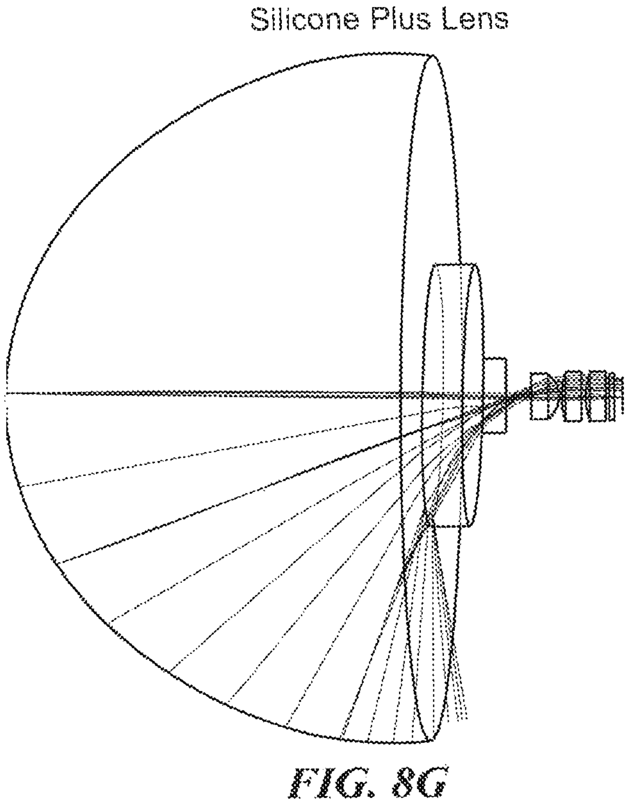
Figure 8H:
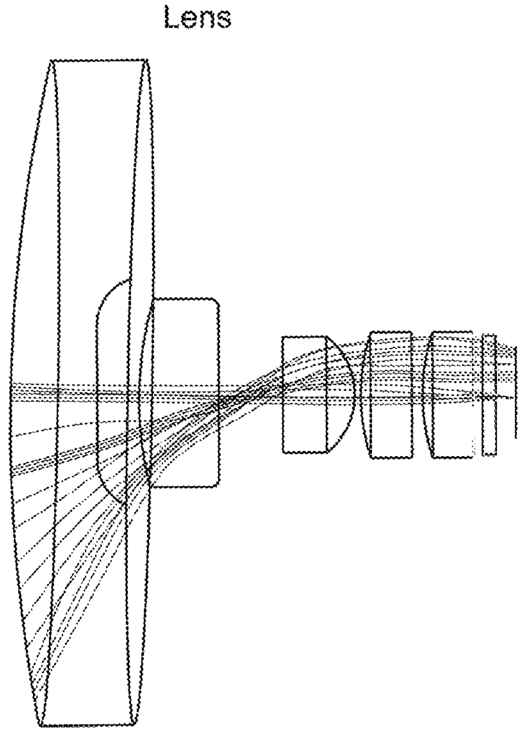

0.862950, CIR S12 0.888102, CIR S13 0.897415, CIR S14 0.866286, CIR S15 0.842312, and CIR S16 0.808351. FIG. 8G illustrate example solid models of silicone plus lens. FIG. 8H illustrates example solid models of lens.

Figure 9:
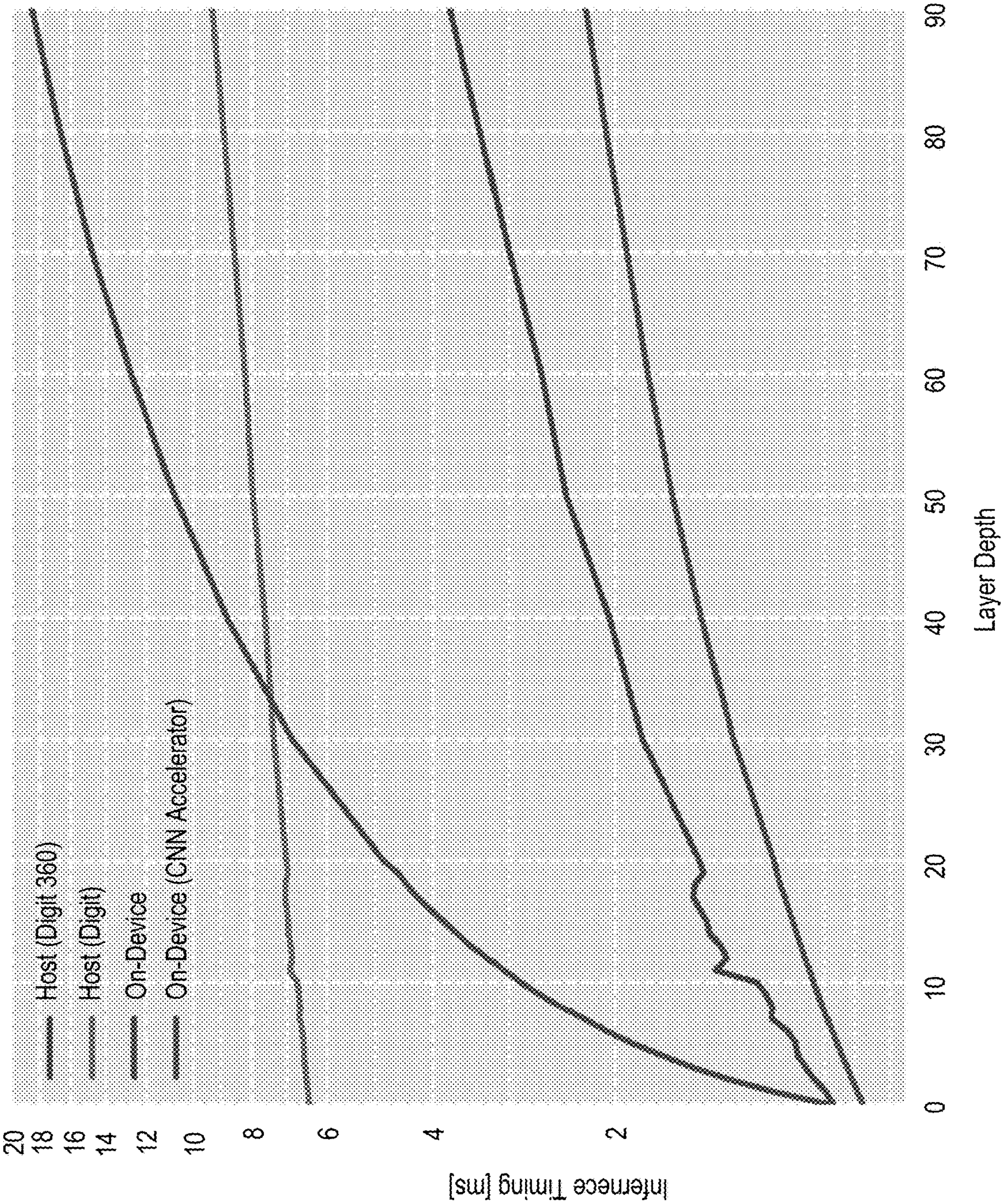
FIG. 9 illustrates example inference latency measurements comparing on-device to host incorporating the tactile data pre-processing and transfer stages.

Using a Gaussian scatter distribution, particular embodiments may model a range of scatter. The scattering parameter, a, may be chosen to achieve the half-width-half-max angles, $\alpha$, of the bi-directional scatter distribution (BSDF) function at normal incidence from, e.g., $\alpha=1°$ to 25°, along with a Lambertian scattering model. FIG. 9 illustrates example inference latency measurements comparing on-device to host incorporating the tactile data pre-processing and transfer stages. FIG. 9 shows that using the on-device CNN accelerator improves inference time and reduces the total latency to producing an action for a MLP deep neural network. A surface texture that minimizes scattering may produce little background illumination. Neither does it produce large shadows created by surface indentations. Additionally, minimizing scatter may produce specular glint reflections, fail to illuminate all indentations equally, and saturate the vision system.

With a fully Lambertian scattering model, the hemispherical surface of the gel fingertip may act as an integrating sphere. While Lambertian scattering provides uniform background illumination, the high scattering illumination from nearby interactions may reduce the overall indentation contrast. The embodiments disclosed herein optimized for high image contrast while maintaining uniform background illumination, the better to image impressions produced by gel indentations and minimize the amount of glints that would saturate the image sensor.

Figure 10:
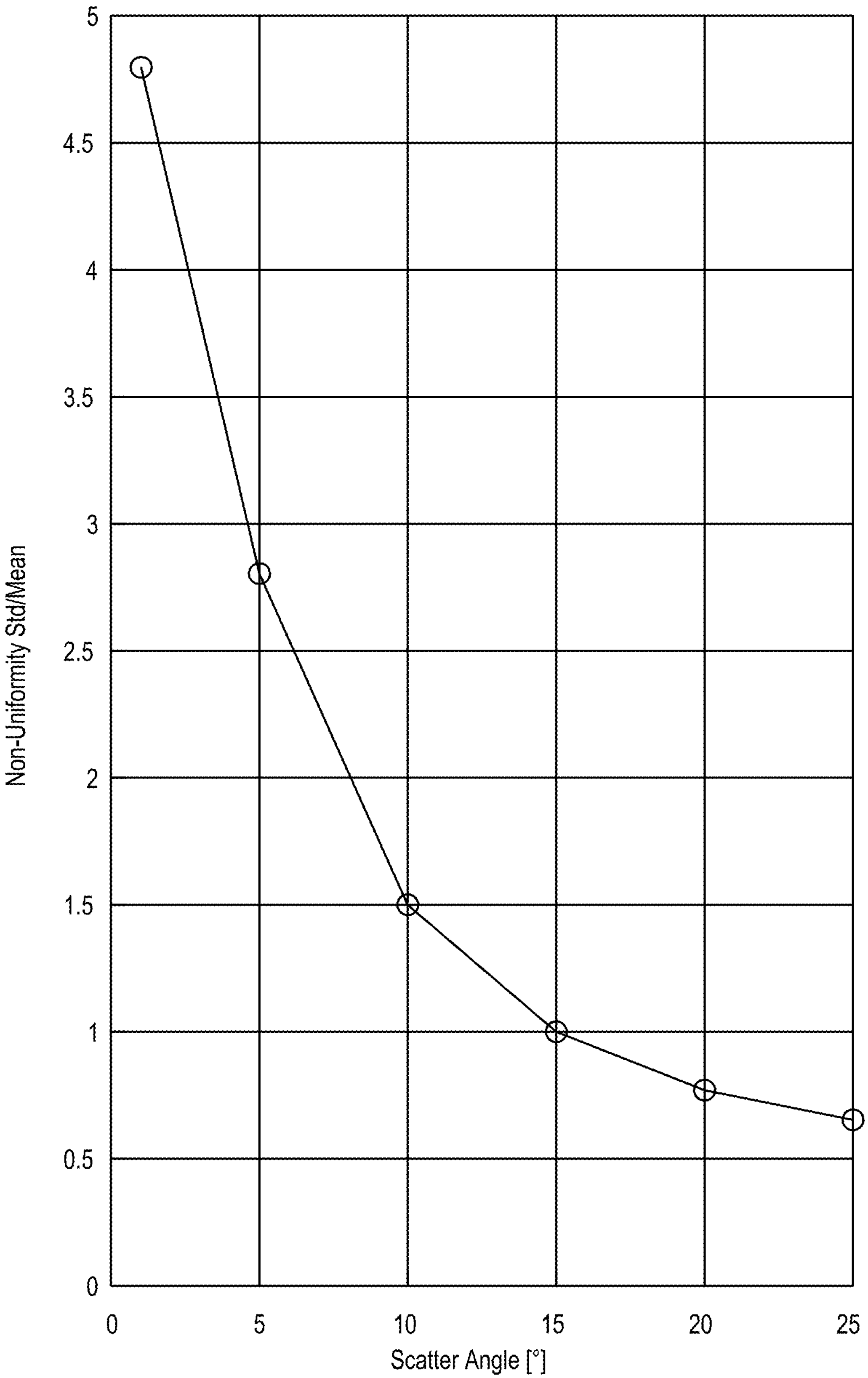
FIG. 10 illustrates example evaluations of non-uniformity metrics.
Figure 10:
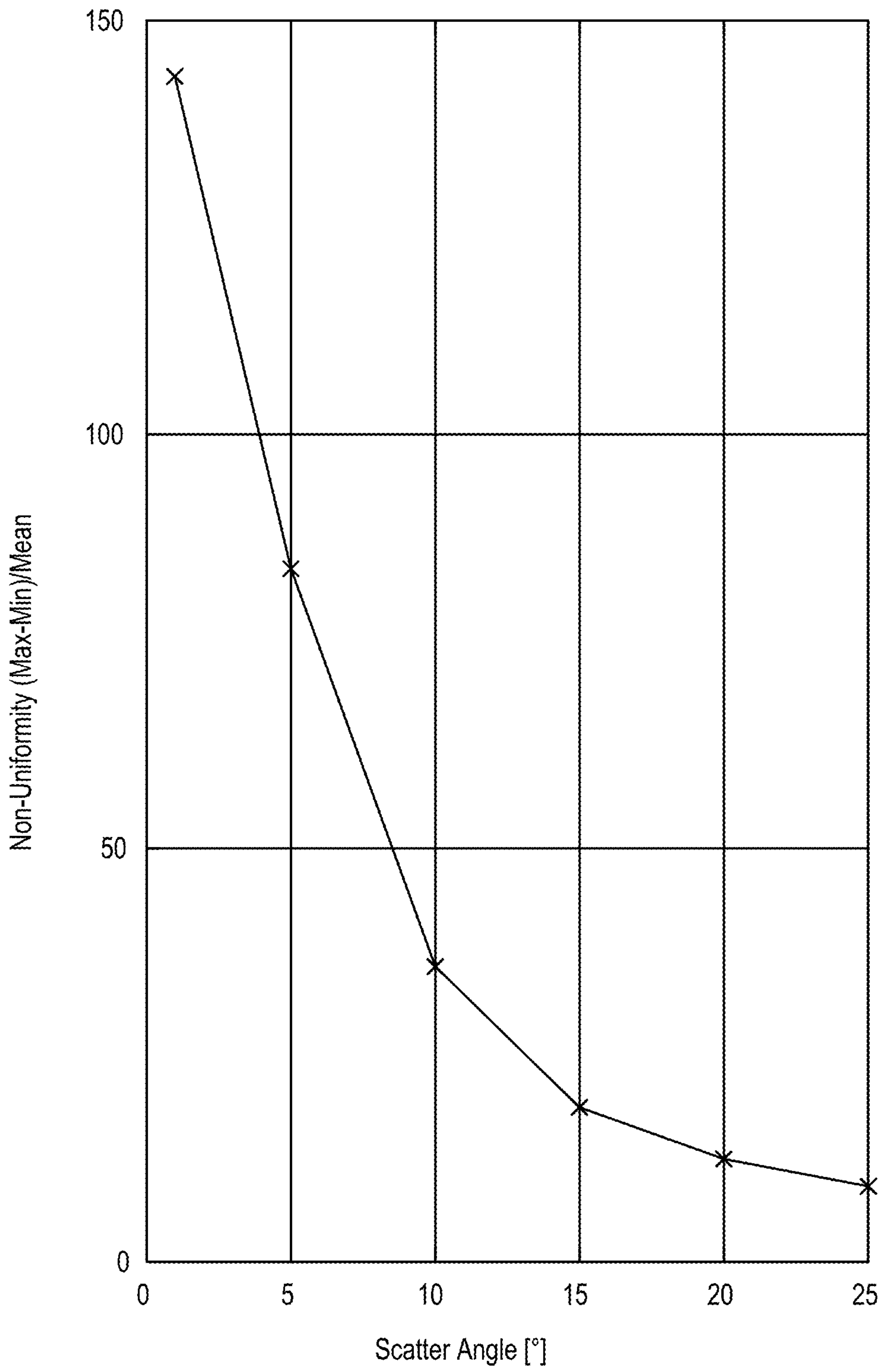

Two non-uniformity metrics were evaluated over the fingertip hemispherical surface, Std/Mean and (Max−Min)/Mean. The embodiments disclosed herein demonstrated that low scatter yields images with a large variation in image signal, requiring the camera to handle high dynamic range. If the image is allowed to saturate, to resolve the variations due to the indentations, the saturated areas of the image may be lost. Thus, in these cases the stray light may be more likely to cause objectionable artifacts. The contrast in the image caused by spherical indentations may be in certain areas high, due to bright glint reflections; but areas with large gradients in the background may make the indentations hard to detect. High scatter may give images with low variation in image signal and no areas may be lost due to saturation. In the image caused by spherical indentations, the contrast may be low in certain areas, but the uniform background may make these easier to detect. FIG. 10 illustrates example evaluations of non-uniformity metrics. Minimizing the background non-uniformity with increasing scatter angle may improve the detection of surface indentations.

The embodiments disclosed herein define a contrast-to-noise (CNR) metric and study three regions of interest on the hemispherical surface for background uniformity noise and indentation contrast. Plotting the calculated CNR across the hemispherical surface for the different scatter angles, it is observed that the CNR is generally higher for less scatter, but CNR is more uniform across the FOV for more scatter. Therefore, the embodiments disclosed herein determine that for a hemispherical fingertip surface the desired texture scattering profile may be constrained between, e.g., half-width-half-max angles of 20° to 25°.

The embodiments disclosed herein comprise a platform based on modular principles to provide an omnidirectional vision-based, multimodal sensing system, and on-device AI capabilities. Particular embodiments may achieve modularity through isolating each part of the system into an electronic assembly with small surface area. Specifically, these modules may include sensing, optics, vision capture, processing, and communications sub-systems shown in FIG. 2. By facilitating re-use of each sub-system, the embodiments disclosed herein present a novel solution to advance the technology in tactile sensor design—reducing the required design, iteration, and manufacturing processes. This may enable one skilled of the art to modify the overall system by adding, removing, and changing sub-systems, rather than having to design a stack of new hardware to support changes to system design. Furthermore, this modular system architecture may allow for selecting combinations of sub-systems to facilitate introduction of newer technologies. Feature removal may reduce costs in adapting the system for new mechanical form factors. As well, the possibility of replacing the sensing fingertip may allow adaptability for different environments and tasks, e.g., by using different sensitivities and stiffness in the fingertip material, or by using fingertips with markers to introduce more prominent optical-flow features. Based on simulation to achieve optimal spatial and force resolution, the embodiments disclosed herein introduce a novel process for the design and manufacturing of the sensing fingertip.

In particular embodiments, the system disclosed herein may provide communications with the host device over the USB 3.0 standard interface. Three separate streams may be provided for data transfer, supporting video, audio, and multimodal data. For example, these streams may collectively output at a maximum rate of 148 MBps and below, depending on the configuration sent to the device. In particular embodiments, tactile sensors may be used in open-loop control, providing information to the host device for processing and additional actions to manipulators. In particular embodiments, edge AI may be added at the fingertip for the following reasons. First, edge AI may help create a latent representation of the data and reduce the overall bandwidth sent to the host device. Second, edge AI may help enable fast local decisions for transmitting actions to manipulators. Third, edge AI may help improve the overall latency of the system while reducing variance in jitter, which is the change in latency. Particular embodiments may model the tactile fingertip system with a manipulator, where both systems may be connected to the host device in a star configuration. This may result in decisions—and actions resulting from tactile information being processed through the host device and disseminated to the manipulators. For more data-intensive designs, capturing data from multiple fingers at once, this arrangement may result in unstable control schemes where information and action latency cannot be guaranteed. To accommodate and expand the terrain of tactile sensing research, particular embodiments may integrate a particular neural network accelerator, for example, a 9 core RISC-V compute cluster with AI acceleration, for on-device processing of selected data streams.

Following high level abstractions of the human reflex arc, the embodiments disclosed herein develop a fast reflex-like control loop using edge AI for local processing. Conventional paradigm of transferring the sensory input to a central control computer for processing, then sending back the control signals, may require high bandwidth while introducing communication latency. In contrast, the paradigm disclosed herein may locally process the sensory input inside the fingertip using edge AI. This may allow drastic reductions of the required bandwidth while greatly minimizing communication latency and minimizing jitter. The embodiments disclosed herein performed an experimental comparison of these two paradigms, shown in Table 2, by measuring the end-to-end latency of the systems using a PCI-e based precision time measurement tool. The embodiments disclosed herein evaluated this experiment on a Linux machine with 64 GB memory and a GPU. First, to ensure granularity in the measurements, each section of the system was isolated, and samples were collected in repeated trials. Second, the embodiments disclosed herein verified these results by subjecting the entire system to repeated measurements and comparing the timing results to the sum of the isolated components. This determined the areas that produce deterministic timing results, as well as highlighting the areas that sustained increased latency and jitter. Furthermore, these results indicated areas of performance improvements and design for future tactile sensors. The results for the entire control loop show how the edge AI paradigm results in a reduction of latency from 4 ms to 1 ms with a desirable smaller variance. In particular embodiments, appropriate edge-AI processing may be extended to further exploit the sequential nature of the camera FIFO memory to parallelize the data capture with the processing, thus yielding even lower latency. In this case, instead of processing the entire image, selected horizontal lines may be sent for processing in the configured region of interest. This may be applicable when touch interactions are most likely to appear in certain regions on the omnidirectional fingertip disclosed herein. The system disclosed herein may support this region-of-interest data output selection for increased resolution and image-capture frequency.

TABLE 2

Normal force prediction error (median) by surface types and regions.

| Surface | Region 1 [mN] | Region 2 [mN] | Region 3 [mN] | Mean [mN] |
|---|---|---|---|---|
| Specular | 1.01 | 1.09 | 1.41 | 1.17 |
| Lambertian | 1.30 | 1.77 | 2.24 | 1.77 |

Figure 11:
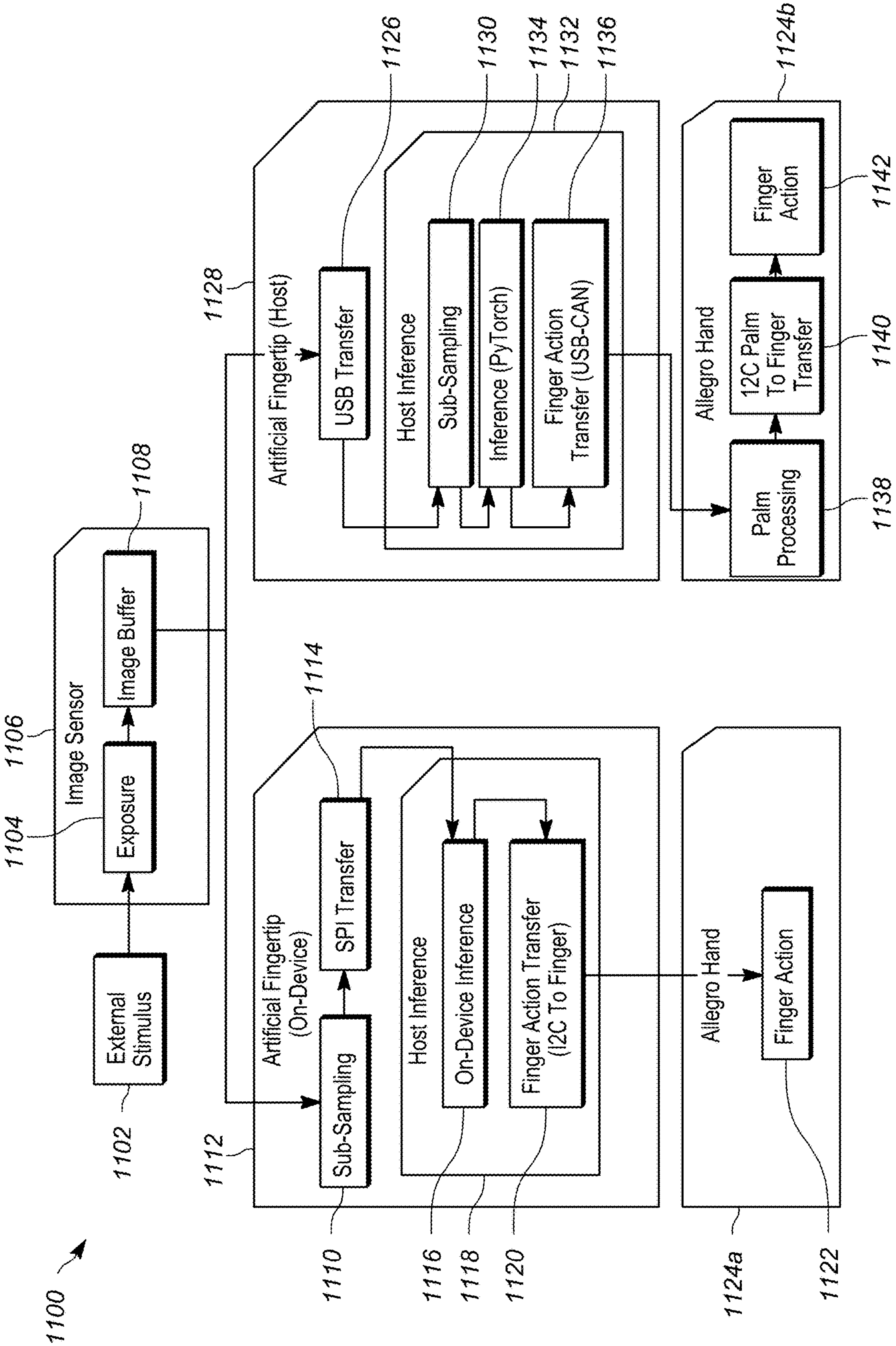
FIG. 11 illustrates an example data capture pipeline for the vision system of the disclosed artificial fingertip and touch information from external stimulus.

FIG. 11 illustrates an example data capture pipeline 1100 for the vision system of the disclosed artificial fingertip and touch information from external stimulus. External stimulus 1102 may be input to the exposure module 1104 of the image sensor 1106. The output of the exposure module 1104 may be input to the image buffer 1108 of the image sensor 1106. The output of the image buffer 1108 may be provided to the sub-sampling module 1110 of artificial fingertip (on-device) 1112. Although this disclosure describes an image sensor for processing external stimulus as an example, this disclosure contemplates any suitable modality or any suitable subset of modalities in replacement of the image sensor.

The output of the sub-sampling module 1110 may be input to the SPI transfer module 1114. The output of the SPI transfer module 1114 may be input to an on-device inference module 1116 of the host inference module 1118. The output of the on-device inference module 1116 may be input to the finger action transfer module 1120 based on I2C to finger transfer. The output of the finger action transfer module 1120 may be used to generate a finger action 1122 for an allegro hand 1124*a* to execute.

In particular embodiments, the output of the image buffer 1108 may be also provided to a USB transfer module 1126 of artificial fingertip (host) 1128. The output of the USB transfer module 1126 may be input to the sub-sampling module 1130 of the host inference module 1132. The output of the sub-sampling module 1130 may be input to the inference module 1134. The output of the inference module 1134 may be input to the finger action transfer module 1136 based on USB-CAN. The output of the finger action transfer module 1136 may go through a palm processing module 1138 of the allegro hand 1124*b*. The output of the palm processing module 1138 may be input to an I2C palm to finger transfer module 1140, the output of which may be used to generate a finger action 1142 for the allegro hand 1124*b* to execute.

Figure 12:
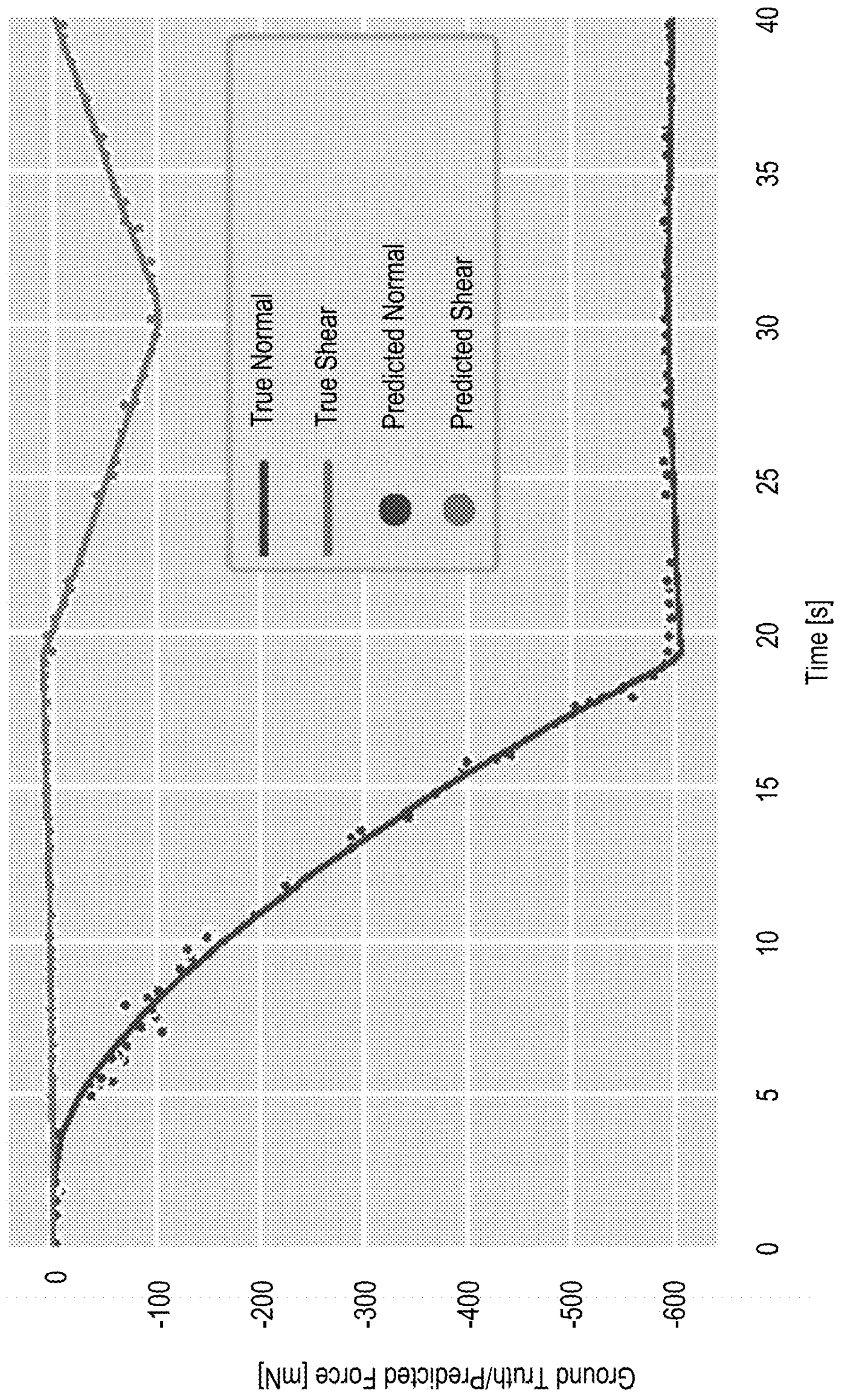
FIG. 12 illustrates example data collection and prediction.

FIG. 12 illustrates example data collection and prediction. The solid line shows ground-truth shear and normal force trajectory during one indentation. The dotted scatter plot shows model-predicted shear and normal force. The embodiments disclosed herein establish two pipelines for data transfer and processing: on-device pipelines and host pipelines, shown in FIG. 12. Additionally, a hybrid mode may support transferring data to the host as well as processing it on the device. It is observed that this affects the vision system because it may involve substantially larger amounts of data than does the multimodal data system. The limiting parameter for dynamic manipulations in a task is the latency between input data, processing, and action commands. To elicit rapid responses to changes in the environment that are detected through changes in grasp stability, particular embodiments may move toward faster processing and a minimization of latency between input and action.

The embodiments disclosed herein studied the effects of the vision system because this may be the most common modality used in touch sensors, with impacts on overall system latency for host and on-device configurations. The constraining factor on system latency between real-world input and data-processing input is the capture rate of the vision system. This may be limited by the frames per second rate, which may impose a delay of 1/fps, and the internal processing of the image-signal processor. For this reason, for example, particular embodiments may incorporate a CMOS sensor with 240 fps and a pixel size of 1.1 um in the system disclosed herein, which may yield a shorter delay of 4.17 ms as opposed to conventional sensors, which may operate at 60 Hz and thus have delays no fewer than 16.7 ms.

The embodiments disclosed herein evaluated the inference latency with two deep neural networks, MLP and MobileNetV2, for two scenarios: on-device and host inference. The two largest sources of latency arise from the tactile data transfer from device to host, and of action data from host to robotic end effector. For example, within the available headroom between the differences in pipeline latency, Tlatency, an upper limit of Tlatency ≤2.463 ms was established. With an MLP-based network, the embodiments disclosed herein increased the layer depth and observed the latency cost for both scenarios. Table 3 shows a ~4× decrease in action latency for dynamic tasks which involve high velocity movements thereby reducing total time to action to less than 1 ms.

TABLE 3

Average data pipeline timing for host and on-device processing.

| | Host [μs] | On-Device [μs] |
|---|---|---|
| Data acquisition | Modality/Frequency Dependent | |
| Data Transfer | 1600 | 248 |
| Sub-Sampling | 6 | 393 |
| Inference | | Model Dependent |
| Action Transfer | 530 | 40 |
| Action | 1010 | 2 |
| Total | 3146 | 683 |

Figure 13:
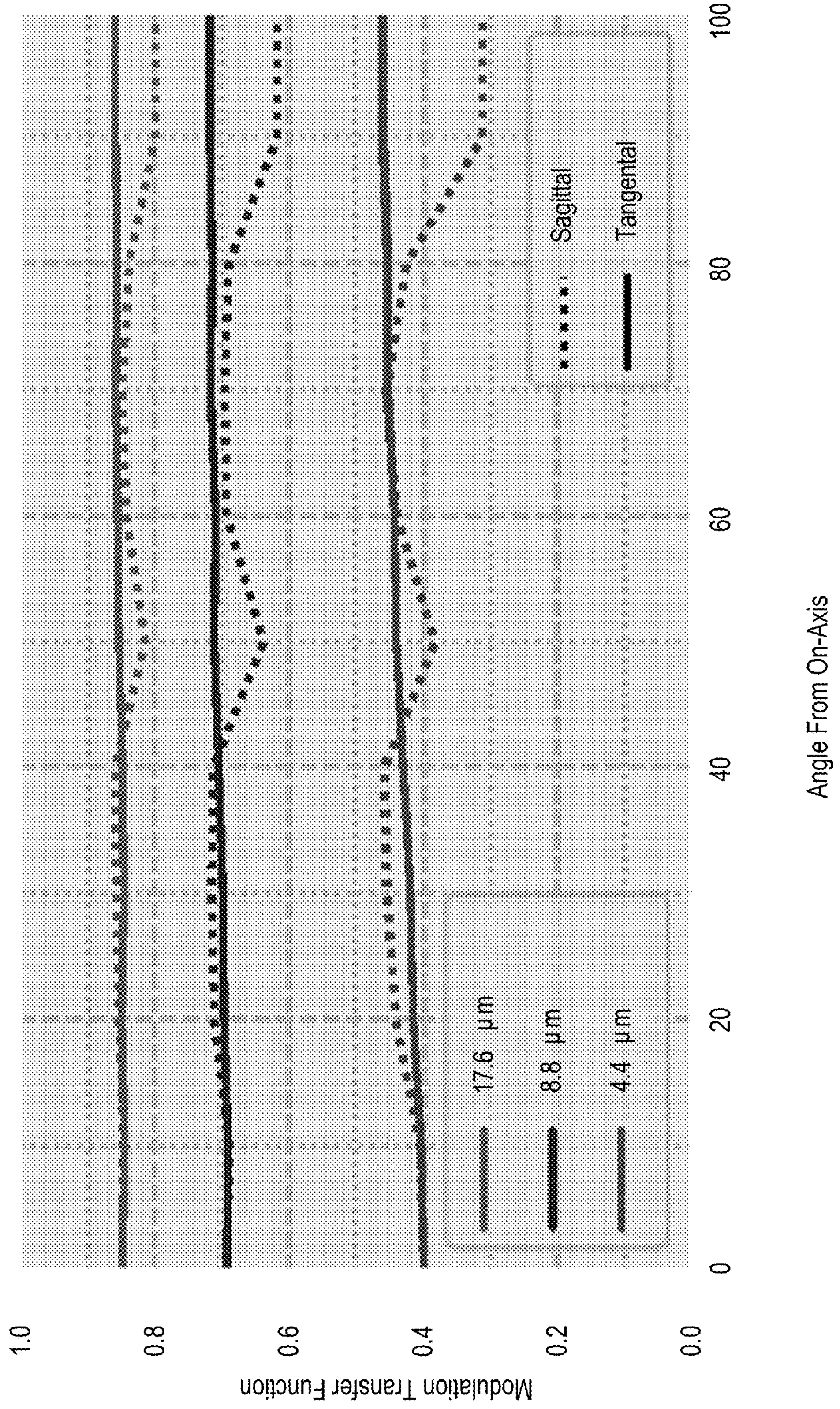
FIG. 13 illustrates example simulated performance of the vision system of the artificial fingertip disclosed herein from on-axis to far-field contact for increasing line pairs per millimeters translated to spatial resolution for sagittal and tangential responses.

FIG. 13 illustrates example simulated performance of the vision system of the artificial fingertip disclosed herein from on-axis to far-field contact for increasing line pairs per millimeters translated to spatial resolution for sagittal and tangential responses. As shown in FIG. 13, it becomes apparent that using the on-device accelerator without enabling the hardware engine quickly exceeds Tlatency at 10-layer depth. However, enabling hardware acceleration may allow for using MLP models with 60 layers.

Figure 14:
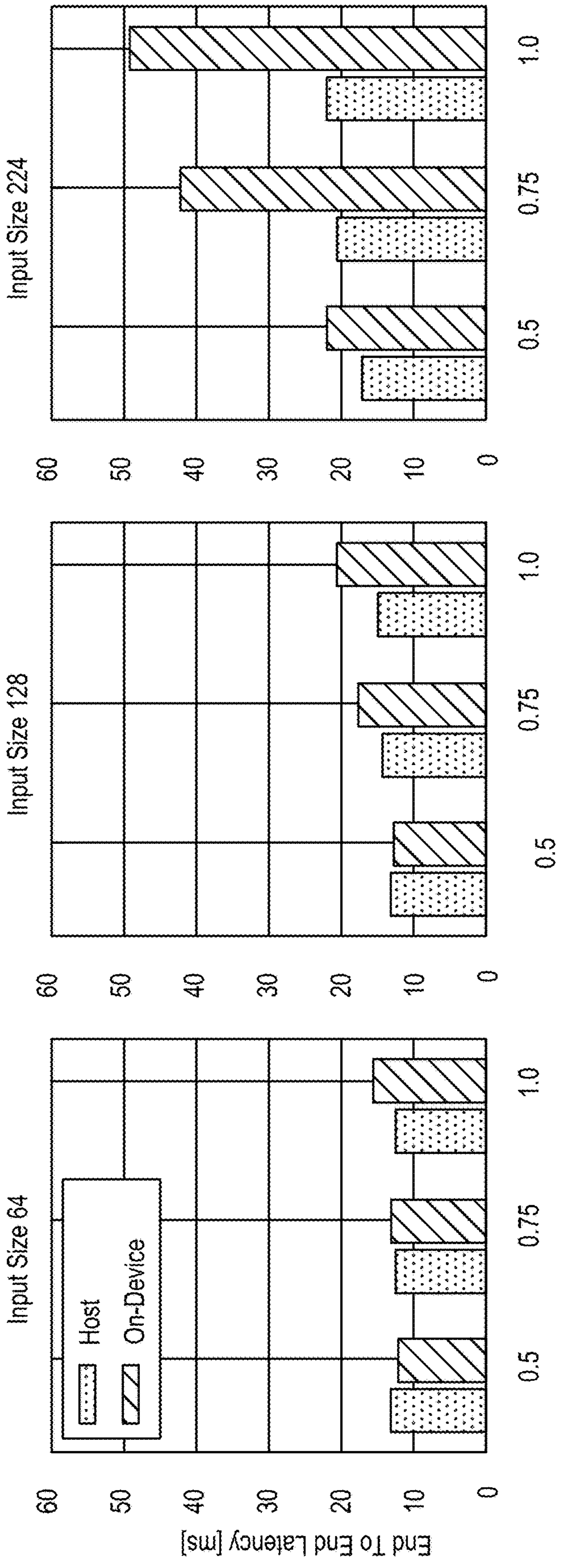
FIG. 14 illustrates example average pipeline latency for a MobileNetV2 network from acquiring tactile data, transferring data, pre-processing, inference to providing actions for varying image and channel width sizes.
Figure 15:
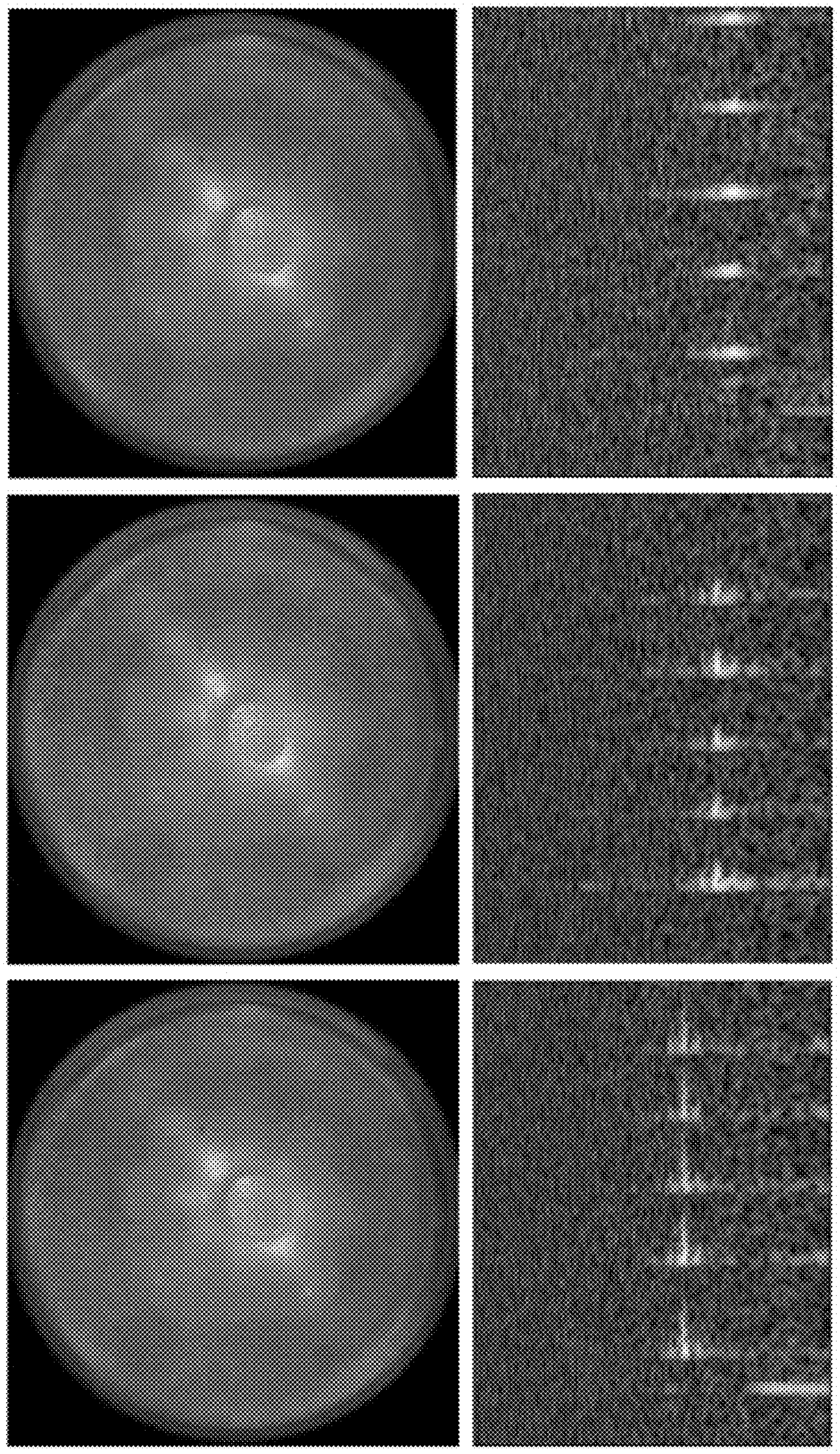
FIG. 15 illustrates an example comparison of touch information from the artificial fingertip disclosed herein tapping a water bottle with varying volumes of water from empty, half filled, and full.

Observing a more suitable use case for the tactile research domain, the embodiments disclosed herein deployed a MobileNetV2 model and determine the total system pipeline latency. FIG. 14 illustrates example average pipeline latency for a MobileNetV2 network from acquiring tactile data, transferring data, pre-processing, inference to providing actions for varying image and channel width sizes. FIG. 15 illustrates an example comparison of touch information from the artificial fingertip disclosed herein tapping a water bottle with varying volumes of water from empty, half filled, and full. While the vision output from the sensor looks nearly identical with only variations in location of touch, multi-modal data may provide a larger insight on object properties beyond texture. FIG. 15 shows that using a MobileNetV2 architecture with input size of 64×64 is beneficial for reducing Tlatency and applicable to common low-level touch tasks, such as touch detection and classification. Furthermore, the Tlatency upper boundary may be determined by the output data rate, size of data transfer, and the host system performance.

However, in practical robotics environments the host system may be running a plethora of control and processing applications, with additional overhead of communication between other sensors and devices that introduce overhead to Tlatency of, e.g., 1.2 ms. Comparing this to a conventional artificial fingertip, the embodiments disclosed herein observed an overhead of e.g., 4.7 ms. These differences may be attributed to the frame rate of the artificial fingertip disclosed herein, e.g., 240 fps, and data transfer over USB 3.0, whereas the example conventional tactile sensor may be limited to 60 fps using USB 2.0. The system disclosed herein may enable tactile on-device inference with low latency control with the ability to have reflex-like control of the device to which the system is connected, as well as providing to the host abstractions of lower-level touch signals. An example may be training an on-device model to regress force from multimodal data to introduce touch and manipulation force limits to objects. Another example may be using the on-device AI capabilities to recognize slip and with low latency provide actions to the robotic end effector to reconfigure grasp.

Figure 16:
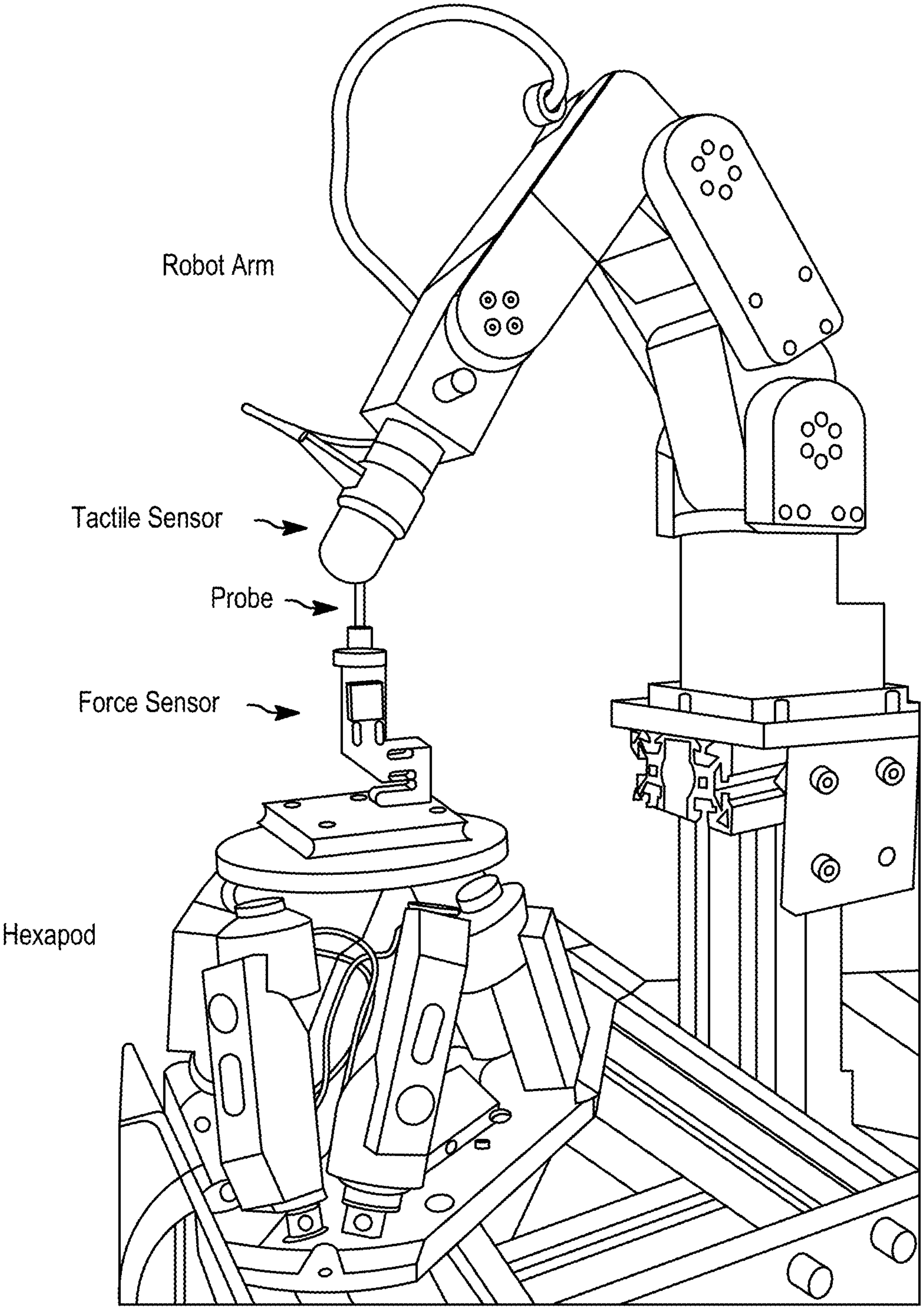
FIG. 16 illustrates an example 6-DoF robot indenter for testing tactile sensor force resolution.
Figure 17A:
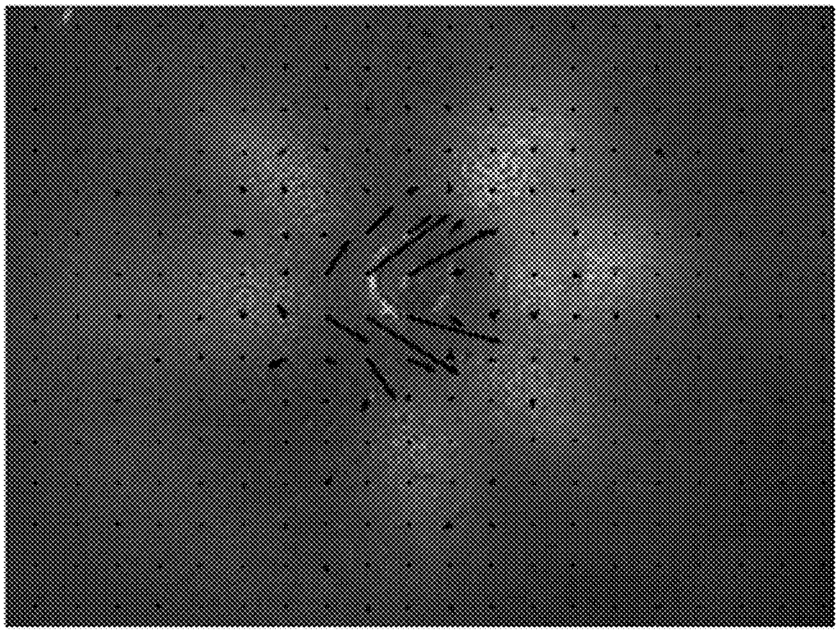
FIGS. 17A-17B illustrate example image snapshots taken by the artificial fingertip disclosed herein from shear force data collection in two key moments.
Figure 17B:
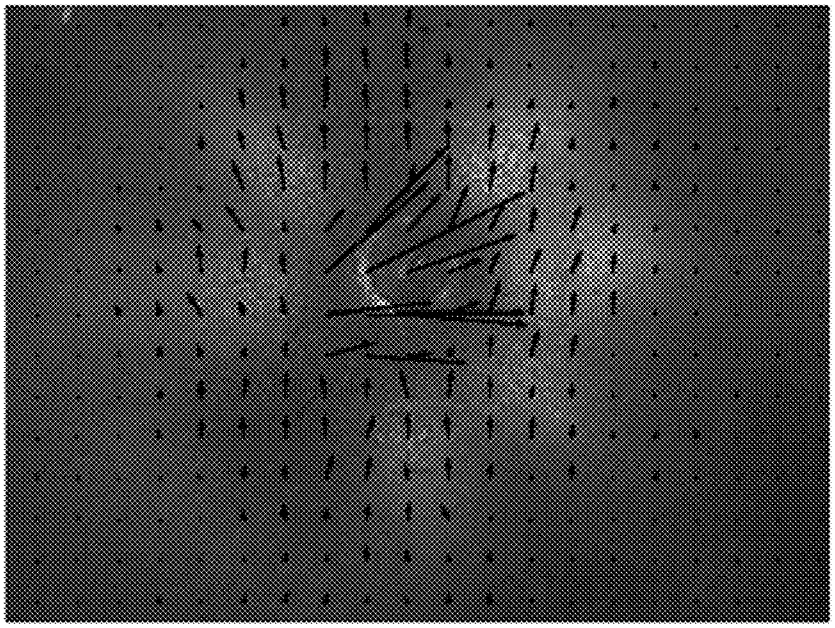

The embodiments disclosed herein design a controllable robot indenter capable of applying with high precision measured 3-axis force on any spatial position of the sensor. FIG. 16 illustrates an example 6-DoF robot indenter for testing tactile sensor force resolution. The robot arm and stage setup may be capable of precisely applying measured force onto a target device with controlled contact spatial location and orientation. FIGS. 17A-17B illustrate example image snapshots taken by the artificial fingertip disclosed herein from shear force data collection in two key moments. The timestamp t corresponds to the trajectory in FIG. 12. The overlay arrow field shows the optical flow with respect to the image without any force applied. As shown in FIGS. 17A-17B, for example, a tactile sensor is mounted on the robot arm to orient the desired test surface down against a probe with precision of 5 μm. As another example, the probe with a hemisphere tip of 4 mm diameter is mounted on a force sensor measuring the ground-truth contact force with 1 mN accuracy. As yet another example, the probe and force sensor assembly are then mounted on a hexapod which can be precisely controlled to translate with 0.1 μm and rotate with 0.05° increment. Due to the rotational symmetry of the artificial fingertip, the embodiments disclosed herein break down the full-surface force characterization into three representative approximately planar regions. For each region, the embodiments disclosed herein repeat the collection process similarly for normal and shear forces.

The embodiments disclosed herein start with normal force collection. For example, for high precision, particular embodiments may use the single-axis force sensor that can measure up to 250 mm. As another example, for each region, the robotic indenter may spatially sample 0.5 mm-spaced grid points on the tangential plane. As yet another example, for each point, the probe may move perpendicular from the plane, pressing into the sensor until the normal force reaches 200 mm. During the contact between the probe and gel (defined as normal force, Fnorm >0.2 mN), both sensor images and measured normal force may be collected synchronously. The embodiments disclosed herein collect about 550 image-force pairs per spatial point. For a 7 mm×6 mm region, the embodiments disclosed herein obtain approximately 12,000 points. This point data is randomly split into training (70%) and testing set (30%).

Figure 18:
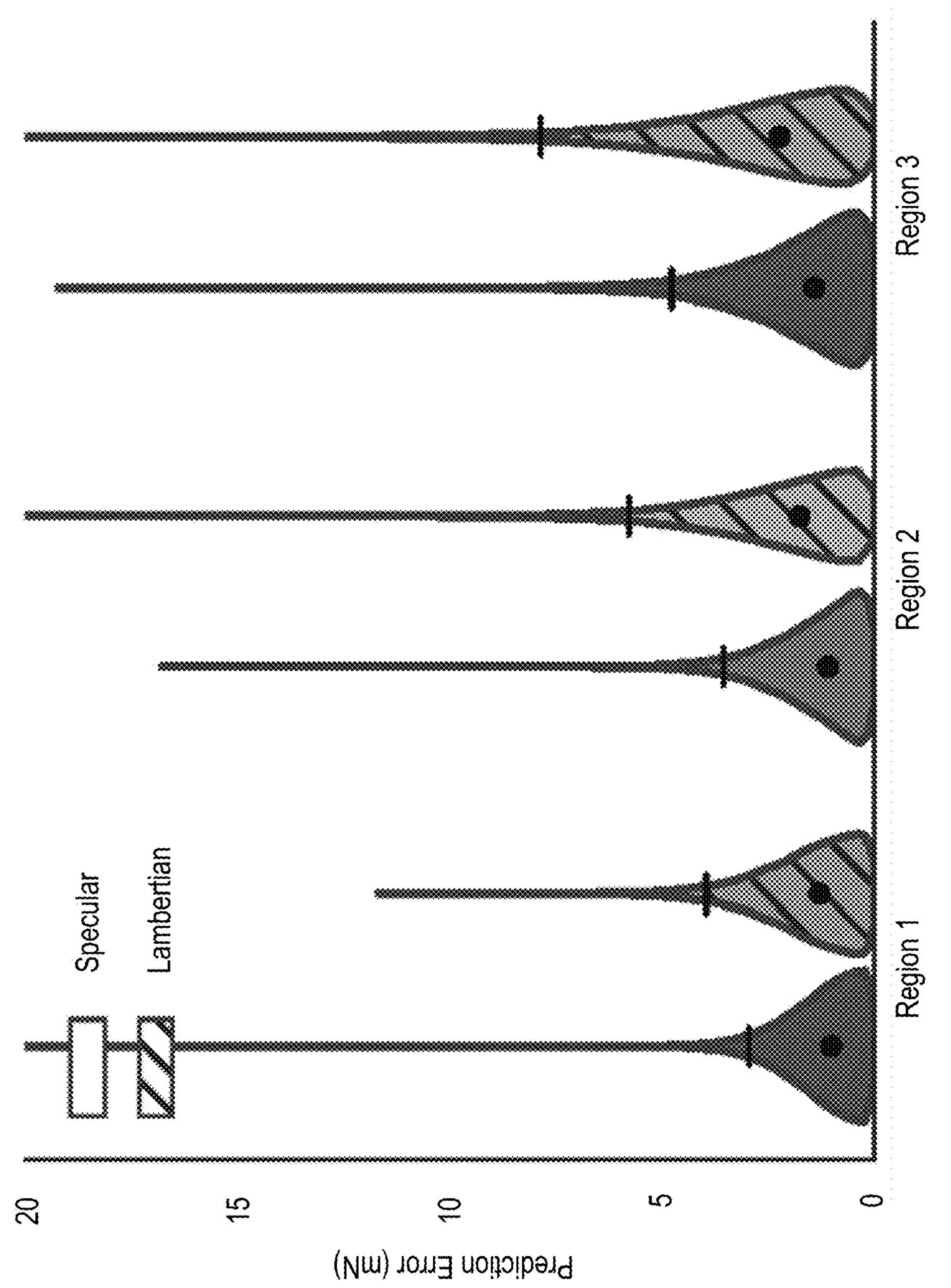
FIG. 18 illustrates an example normal force prediction error distribution by surface types and regions.

For shear-force data collection, particular embodiments may select a 3-axis force sensor to simultaneously measure normal force and shear force. Particular embodiments may apply sufficient friction while varying shear force. FIG. 18 illustrates an example normal force prediction error distribution by surface types and regions. The dots and error bar show the median and 95-percentile of the error respectively. FIG. 18 shows how each shear-force indentation trajectory may be controlled. For example, first, the probe may be moved perpendicular to the contact surface to apply up to 600 mm normal force. Next, the probe may be moved tangential to the surface, loading shear force up to 100 mm. Finally, the probe may be moved back to the previous location, unloading shear force. If non-zero residual shear force remained after unloading, slip might have occurred—in which case the data may be discarded.

Contact-force prediction on vision-based tactile sensors such as the system disclosed herein may be achieved using an image-to-force regression model. The model may be calibrated from reference data. Once calibrated, particular embodiments may evaluate the sensor-model as a system for force-sensing performance on a testing dataset. The embodiments disclosed herein collected the dataset for training and evaluating the model to benchmark normal and shear-force-sensing performance. Particular embodiments may use a modified ResNet50 deep neural network for the image-to-force regression model. For example, the network may take an input image of 224×224×3 and output 1024-way object-classification probabilities. Particular embodiments may replace the classification head with a scalar-output linear layer predicting the force. Particular embodiment may use mean-square error as the loss, then optimize with Adam with initial learning rate search. In one example embodiment, the raw images from the sensors are 640×480, which may be down scaled to 224×224 with 20-pixel spatial jitter to improve spatial invariance. Particular embodiments may pool training data from all three regions to train a single model and obtain the prediction performance (median error) breakdown by regions as described in FIG. 2A.

Figure 19:
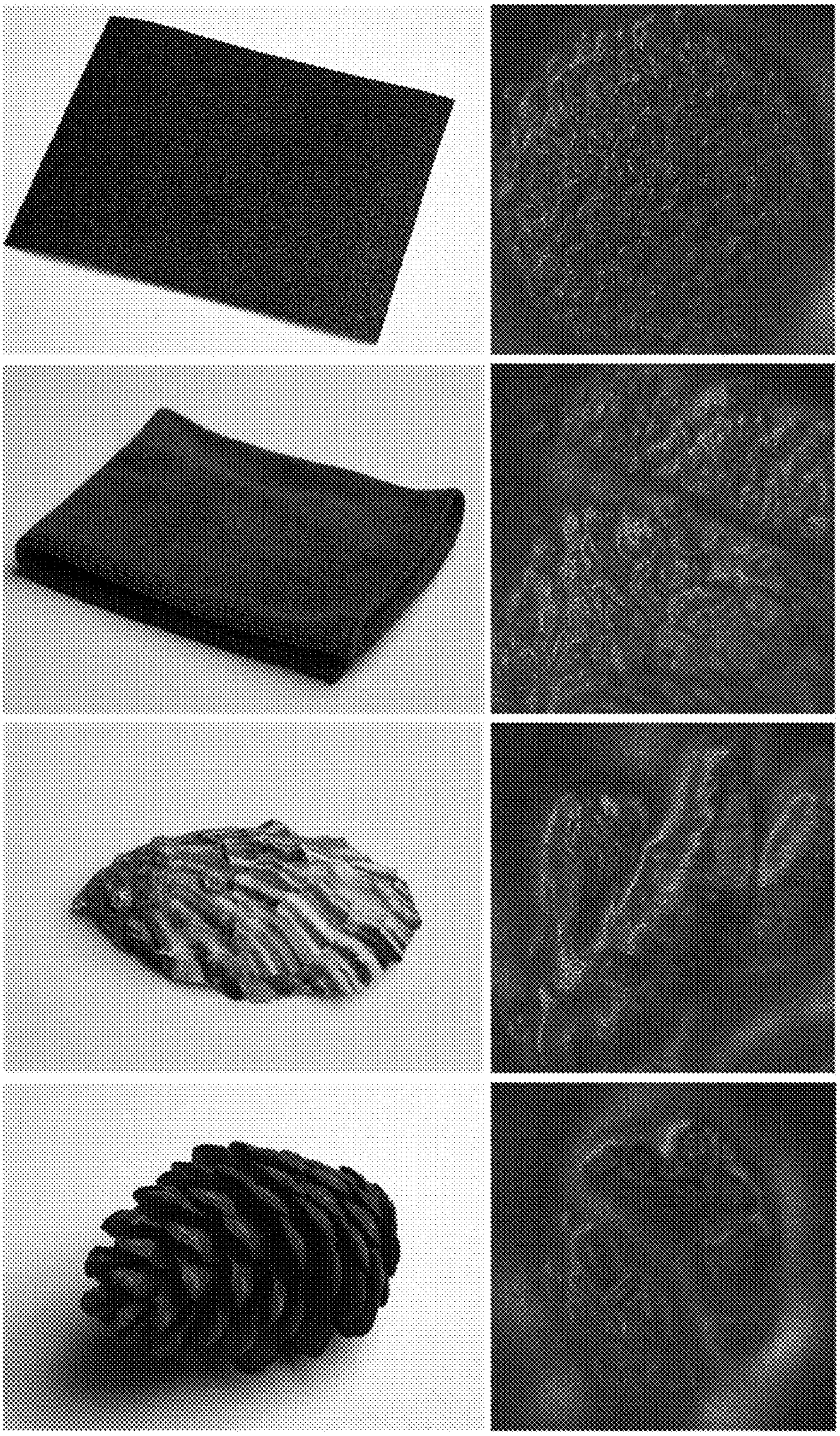
FIG. 19 illustrates an example capture amongst vision-based touch sensors.

The embodiments disclosed herein evaluated additional normal-force resolution performance with two kinds of gel surface finish: specular and Lambertian. Lambertian surface scattering, typically considered preferable for vision-based tactile sensors, was outperformed by its specular counterpart. This may come from the enhancement of surface texture contrast due to specular reflection, which helps the imaging system track gel deformation. FIG. 19 illustrates an example capture amongst vision-based touch sensors. Objects shown from top to bottom: sandpaper, cloth, oyster and a configure cone. FIG. 19 shows the center-crop of the image captured by the system disclosed herein, where the texture contrast is more evident in the region with strong specular reflections from the LEDs. The embodiments disclosed herein obtained clear optical flow (shown in the figure by arrows) within these texture-rich regions, corresponding to fingertip deformation caused by shear and normal force applied by the probe.

Conventionally, a general view held that some tracking pattern (dots, for example) may be required for shear force measurement. However, the optical flow result reported above suggests that this requirement may be relaxed, due to the increasing resolution and quality of images. Such advancements may facilitate using the natural fingertip surface texture to observe gel deformation, and in turn to perform shear force estimation.

Particular embodiments may establish a modality within the artificial fingertip to determine object state and obtain clues on object classification. Particular embodiments may identify two key performance metrics for fingertip gas sensing: accuracy and signal acquisition time. The embodiments disclosed herein observe 6 different materials from liquid to solid commonly found in a household environment. These materials are coffee powder, liquid coffee, a nondescript rubber material, cheese, and a spread of soap and butter on a surface. All the materials were sampled at room temperature with a robotic arm and the disclosed artificial fingertip approaching the samples to near contact, within 1 cm, for a duration of 90 s. The embodiments disclosed herein record multimodal data and isolate the humidity, temperature, pressure, gas oxidation resistance datapoints at the maximum output frequency for each sampling modality. Over 100 approaches to each material are collected during a 3-hour sampling period. Between each approach, the embodiments disclosed herein sample air from the local environment. The raw data with the modalities of interest listed above are provided as inputs to a multi-layer perceptron network with a single 64-node hidden layer. The embodiments disclosed herein train the network with cross-entropy loss using an Adam optimizer with learning rate 0.1. The embodiments disclosed herein show the final accuracy of the model is not sensitive with respect to the size of hidden layers or learning rate. For example, the embodiments disclosed herein show that through these 6 materials a classification accuracy of 91%. Furthermore, as another example, the embodiments disclosed herein show the signal acquisition time to reach 66% accuracy.

The embodiments disclosed herein evaluate the disclosed artificial fingertip in performance with respect to spatial resolution, shear and normal forces, illumination, vibrations, heat, and local gas sensitivity.

Figure 20A:
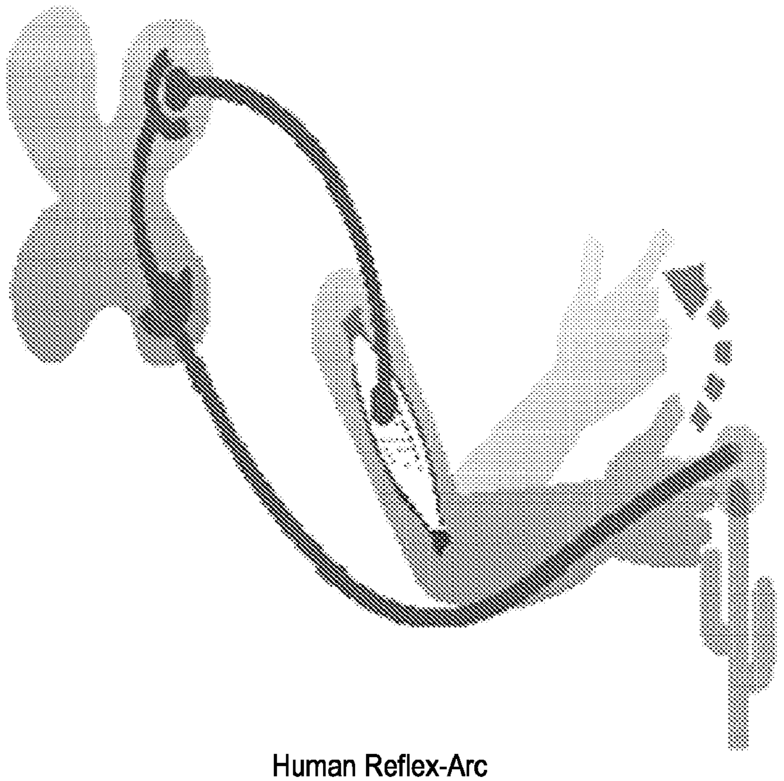
FIG. 20A illustrates an example analog of the human reflex-arc by quickly processing sensory input within the fingertip, directly controlling the actuators of a robot hand to retract in response to touching an object.
Figure 20B:
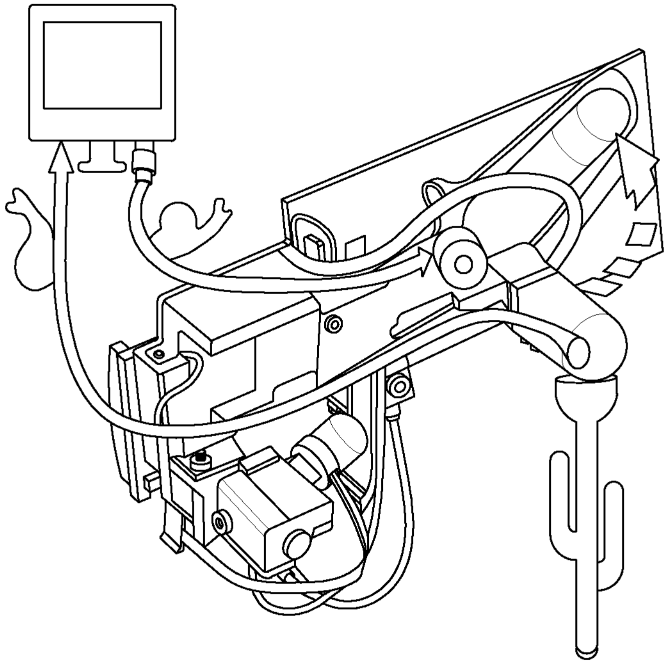
FIG. 20B illustrates example tactile processing and control paradigm transfer of sensory data to a remote computer for processing.
Figure 20C:
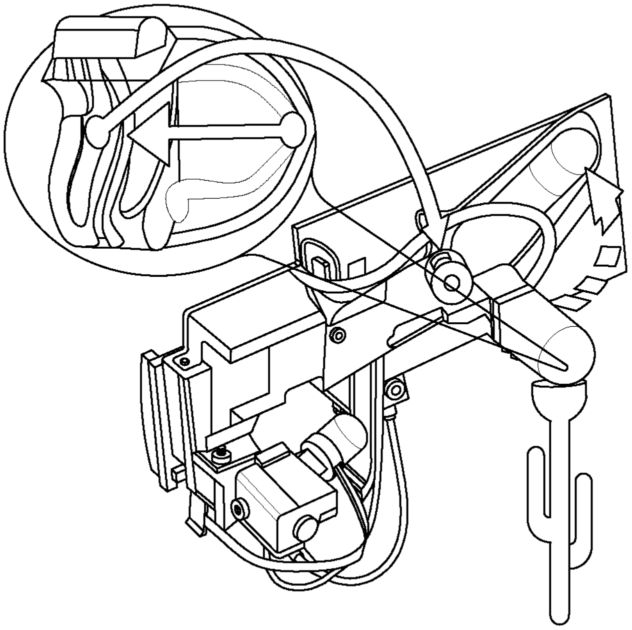
FIG. 20C illustrates example local processing for mimicking the reflex-arc with the system fingertip.
Figure 20D:
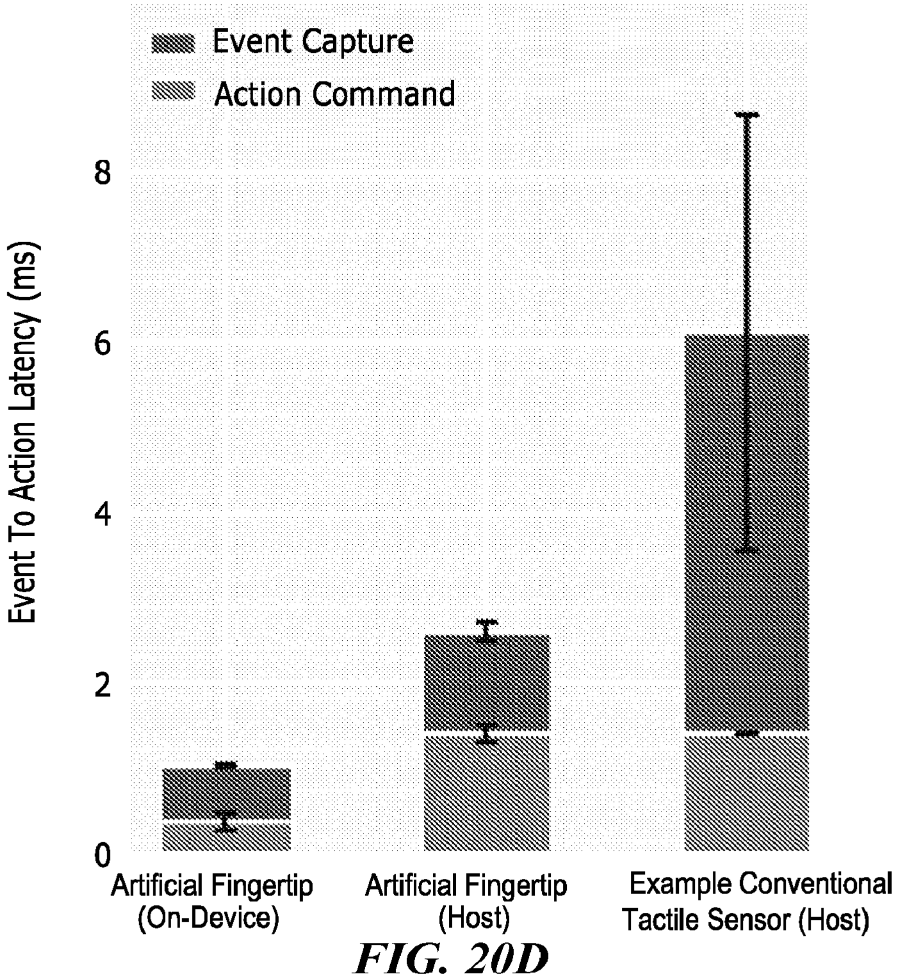
FIG. 20D illustrates example mean and standard deviation of the event-to-action latency.

FIG. 20A illustrates an example analog of the human reflex-arc by quickly processing sensory input within the fingertip, directly controlling the actuators of a robot hand to retract in response to touching an object. FIG. 20B illustrates example tactile processing and control paradigm transfer of sensory data to a remote computer for processing. This requires sufficient bandwidth and introduces communication latency. FIG. 20C illustrates example local processing for mimicking the reflex-arc with the system fingertip. The system disclosed herein may use the on-device AI neural-network accelerator for local processing to decrease overall latency between event and action. FIG. 20D illustrates example mean and standard deviation of the event-to-action latency. For example, the on-device local processing and control loop may take 1.2 ms compared to the conventional paradigm, which may take 2.5 ms on the disclosed artificial fingertip and over 6 ms on the example conventional tactile sensor.

The embodiments disclosed herein model the fingertip surface as a two-layer stack formed by an external diffusive material adhered to an internal reflective thin-film which is grown onto the non-rigid solid silicone body of the fingertip. In other words, the silicone hemispherical dome may further comprise a protective diffusive layer coated to the reflective silver-film layer. The embodiments disclosed herein then explore the effects of the non-rigid solid silicone surface mechanical properties, texture and the degree of controlled light scattering to find an optimal performance metric between background uniformity and image contrast. The embodiments disclosed herein show that increasing controlled surface texture scatter from 1-degree scattering to a Lambertian scatter results in an increase in background illumination uniformity thereby an increase in image impression contrast. However, with low degrees of scattering, intense hotspots artifacts may dominate the background whereas when the degree of scattering approaches Lambertian scattering, these artifacts may decrease along with a decrease in image contrast which may directly result in decreased sensitivity to impression stimuli. With little or no scatter with a polished surface, minimal background illumination may be present which motivates the production of shadows created by indentations against the fingertip surface. Furthermore, glint reflections off produced indentations may be minimal to non-existent and may not produce a consistent appearance across the surface. On the contrary, with the conventional method of visual-tactile sensors using Lambertian scattering surfaces, the embodiments disclosed herein show that the hemispherical sensing surface may act as an integrating sphere, where shadows may cast by direct illumination striking the indentations are wiped out by scattered illumination from other areas and even while imaging may occur on far off-axis angles, their contrast may be low. The embodiments disclosed herein introduce a controlled degree of scattering in which an optimized uniform background illumination may be achieved that lends itself well to contrast between indentations and the surrounding surface, furthermore, all indentations are imaged (see FIG. 2).

The embodiments disclosed herein evaluate the normal force sensitivity and first collect tuples of normal forces applied by a micro-indenter and corresponding outputs from the sensors, and then train a deep-learning model from this dataset. For example, the trained model (see FIG. 2A) may predict the normal forces applied with a median error of 1.01 mN (Region 1). Similarly, to measure the shear force sensitivity, the embodiments disclosed herein first collect tuples of shear forces applied by a micro-indenter and corresponding outputs from the sensors, and then train a deep-learning model from this dataset. For example, the model (see FIG. 2A) is capable of predicting shear forces applied with a median error of 1.27 mN (Region 1). In contrast to conventional sensors that required the presence of explicit markers, this result demonstrates that with a sufficiently high optical resolution the embodiments disclosed herein may directly use the internal texture of the elastomer to measure shear forces.

To carry out spatial resolution evaluations, the embodiments disclosed herein define the spatial resolution of an artificial fingertip sensor as the minimum feature size that can be resolved with an MTF ≥0.5; this may be determined by how well the contrast is preserved quantified by line pairs per millimeter. The embodiments disclosed herein first simulate the imaging system from the design which yields that on-axis contacts are resolvable for features of size ≥6 um for region 1, ≥8 um for region 2 resolves, and ≥22 um for region 3. The embodiments disclosed herein then validate these results by collecting data with a two-pronged micro-indenter depressed onto the fingertip, varying the distance between the two prongs and observing the taxel intensity line profile; both the visual validation and the inspection of the taxels profile intensity confirmed the embodiments disclosed herein may clearly distinguish features as small as ≥7 um for region 1 (see FIG. 2C).

Multimodal information such as vibrations upwards of 10 kHz, auditory clues, sensitivity to heat and smells may play an important role in human touch. However, typical vision-based tactile sensors may not contain a broad range of multimodal capabilities to capture this information or operate lower sensing frequencies such as 60 Hz. Even with the fast camera of the disclosed artificial fingertip which operates at, e.g., 240 Hz, highly dynamic movements may not be fully captured. The embodiments disclosed herein evaluate capturing vibrations up to 10 kHz which may be enough to distinguish between different materials upon a simple light sliding of the finger. Furthermore, the embodiments disclosed herein show that these multimodal features can be used to detect the amount of liquid inside a bottle by simply tapping it with a fingertip (see FIG. 2A), like audio and vibratory clues consumed by humans during object interactions. Along audio and vibratory clues, humans evaluate touch interactions based on changes in local heat gradients. The embodiments disclosed herein may detect changes in heat gradients which reflect object state, room temperature, warm, hot, dangerous (see FIG. 2C). In regard to object state, there may be a limited amount of information which is captured during visuo-tactile contact. The embodiments disclosed herein employ the use of local gas sensing at each fingertip to understand nuances in object state, e.g., determining if the object is slippery or wet. With this modality, the embodiments disclosed herein may sense these parameters during approach and contact (see FIG. 2E). Specifically, the embodiments disclosed herein evaluate contact different samples which not only provide gas signatures, but local environmental information such as humidity and temperature gradients to distinguish between two similarly looking liquids and coffee or coffee grind (see FIG. 2D). The use of multimodal sensing may complement the main vision-based sensing modality and enable future work into the importance of the different touch modes for task-specific applications.

As inspired by the human reflex arc, the embodiments disclosed herein demonstrate a fast reflex-like control loop using the on-device AI neural-network accelerator for local processing. Compared to conventional sensors using an external computer for processing, on-device processing on the artificial fingertip disclosed herein may reduce latency, for example, from 6 ms to 1.2 ms (see FIG. 3D). With the increasing computational power of on-device accelerators, larger surfaces used for sensing touch, and increasing use of AI models for touch processing, the capability of processing data locally and transfer only high-level features may prove crucial for touch processing.

The embodiments disclosed herein may advance the state of artificial fingertip sensing towards digitizing fingertip interactions between the environment and objects. The embodiments disclosed herein disclose an artificial fingertip that may be more sensitive in spatial and force sensitivity compared to conventional methods with the additional technical advantage of multimodal sensing features and a local processing ability. Experimental results demonstrate the digitization of touch with capabilities that outperform a human fingertip. The richness of touch digitized by the disclosed modular platform may open new promising venues into studying the nature of touch in humans and investigating key questions around the digitization and processing of touch as a sensor modality. Moreover, the embodiments disclosed herein may open the doors to a wider adoption of touch sensors beyond conventional niche fields: In robotics, to improve sensing and manipulation capabilities with benefits for applications in manufacturing and logistics, medical robotics, agricultural robotics, and consumer-level robotics; In artificial intelligence, to investigate the learning of appropriate tactile and multimodal representations, and corresponding computational models that can better exploit the active, spatial and temporal nature of touch. Further potential applications may include virtual reality and telepresence, prosthesis, and e-commerce.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for touch digitization, comprising:

a silicone hemispherical dome comprising a surface comprising a reflective silver-film layer;

an omnidirectional optical system comprising:

a lens comprising a plurality of lens elements, a first lens element of the plurality of lens elements is in direct contact with the silicone hemispherical dome without an airgap, and the lens is configured to capture scattering of internal incident light generated by the reflective silver-film layer; and an image sensor configured to generate image data from data captured by the lens;

non-image sensors disposed underneath the omnidirectional optical system;

one or more processors;

a non-transitory memory coupled to the one or more processors comprising instructions executable by the one or more processors, operable when executing the instructions to:

access the image data from the omnidirectional optical system and sensing data from the non-image sensors; and generate, based on the accessed image and the sensing data by machine-learning models, the touch digitization.

2. The system of claim 1, wherein the lens comprises a solid immersion lens.

3. The system of claim 1, wherein the lens comprises a hyperfisheye lens.

4. The system of claim 1, wherein the non-image sensors comprise one or more of an inertial measurement unit (IMU) sensor, a microphone, an environmental sensor, a gas sensor, a pressure sensor, or a temperature sensor.

5. The system of claim 1, wherein the first lens element is configured to comprise a maximum clear aperture diameter of 10 millimeters.

6. The system of claim 1, wherein materials associated with the silicone hemispherical dome are determined based on a plurality of material parameters comprising one or more of gel radius, coating layer thickness, gel layer thickness, height, coating Young's modulus, or gel Young's modulus.

7. The system of claim 1, wherein the silicone hemispherical dome is based on a Polydimethylsiloxane (PDMS) material.

8. The system of claim 1, wherein the silicone hemispherical dome further comprises a protective diffusive layer coated to the reflective silver-film layer.

9. The system of claim 1, further comprising:

a housing based on a shape of a human thumb, wherein the silicone hemispherical dome, the omnidirectional optical system, the non-image sensors, the one or more processors, and the non-transitory memory are disposed in the housing.

10. The system of claim 1, further comprising:

a stack-up comprising a plurality of printed circuit boards for the one or more processors, the omnidirectional optical system, and a data transfer system, the plurality of printed circuit boards share a common electrical interface and connector stack.

11. The system of claim 1, wherein the one or more processors comprise one or more of a microprocessor or an accelerator.

12. The system of claim 1, wherein:

the machine-learning models comprise neural-network models;

the one or more processors comprise one or more neural-network accelerators; and the neural-network accelerators are configured to accelerate real-time inference on the accessed image and the sensing data by the neural-network models.

13. The system of claim 1, wherein the one or more processors are further operable when executing the instructions to:

provide control signals to a secondary device associated with the system.

14. The system of claim 13, wherein the secondary device comprises a robotic end effector.

15. The system of claim 1, wherein the silicone hemispherical dome is generated based on:

manufacturing a mold from aluminum;

finishing the mold with a machine polishing pass;

preparing the mold for gel casting through a salinization process in a desiccator;

preparing a gel material using a cure silicone rubber compound;

combining the gel material in a speed mixer under vacuum;

casting the gel material into the mold;

curing the casted gel material at a first temperature for a first amount of time; and removing a gel hemispherical dome from the mold once the casted gel material is cured.

16. The system of claim 15, wherein the reflective silver-film layer is generated based on:

preparing a glucose solution by dissolving a first amount of glucose in a second amount of $H_2O$ and adding a third amount of KOH;

preparing an $AgNO_3$ solution by dissolving a fourth amount of $AgNO_3$ in a fifth amount of $H_2O$ and adding a sixth amount of $NH_3$;

preparing a plating solution by mixing the glucose solution and $AgNO_3$ solution;

cleaning the gel hemispherical dome using oxygen plasma for a second amount of time;

activating the gel hemispherical dome in a solution of a seventh amount of $SnCl_2$ in an eight amount of $H_2O$ for a third amount of time;

suspending the gel hemispherical dome into the plating solution for a fourth amount of time;

rinsing the gel hemispherical dome with $H_2O$; and air drying the gel hemispherical dome.

17. The system of claim 1, further comprising:

an illumination system comprising a plurality of controllable light-emitting diodes emitting Lambertian diffuse light, the illumination system is configured to generate volume illumination with configuration illumination parameters.

18. The system of claim 17, wherein the configuration illumination parameters comprise one or more of wavelength, intensity, or positioning.

19. An artificial fingertip for touch digitization, comprising:

a silicone hemispherical dome;

an omnidirectional optical system comprising:

a lens comprising a plurality of lens elements, a first lens element of the plurality of lens elements is in direct contact with the silicone hemispherical dome without an airgap; and an image sensor configured to generate image data from data captured by the lens; and non-image sensors disposed underneath the omnidirectional optical system.

20. A system for touch digitization, comprising:

a silicone hemispherical dome comprising a surface comprising a reflective silver-film layer;

an omnidirectional optical system comprising:

a lens configured to capture scattering of internal incident light generated by the reflective silver-film layer; and an image sensor configured to generate image data from data captured by the lens; and non-image sensors disposed underneath the omnidirectional optical system.

* * * * *